United States Patent
Li et al.

(10) Patent No.: US 10,419,552 B2
(45) Date of Patent: Sep. 17, 2019

(54) PUBLICATION AND DISCOVERY OF M2M-IOT SERVICES

(71) Applicant: Convida Wireless, LLC, Wilmington, DE (US)

(72) Inventors: Xu Li, Plainsboro, NJ (US); Quang Ly, North Wales, PA (US); Lijun Dong, San Diego, CA (US); Guang Lu, Thornhill (CA); Shamim Akbar Rahman, Cote St. Luc (CA); Zhuo Chen, Claymont, DE (US); Chonggang Wang, Princeton, NJ (US)

(73) Assignee: Convida Wireless LLC, Wilmington, DE (US)

( * ) Notice: Subject to any disclaimer, the term of this patent is extended or adjusted under 35 U.S.C. 154(b) by 134 days.

(21) Appl. No.: 15/327,812

(22) PCT Filed: Jul. 22, 2015

(86) PCT No.: PCT/US2015/041493
§ 371 (c)(1),
(2) Date: Jan. 20, 2017

(87) PCT Pub. No.: WO2016/014642
PCT Pub. Date: Jan. 28, 2016

(65) Prior Publication Data
US 2017/0208139 A1  Jul. 20, 2017

Related U.S. Application Data

(60) Provisional application No. 62/027,398, filed on Jul. 22, 2014.

(51) Int. Cl.
*G06F 15/16*   (2006.01)
*H04L 29/08*   (2006.01)
(Continued)

(52) U.S. Cl.
CPC .......... *H04L 67/16* (2013.01); *H04L 41/0853* (2013.01); *H04L 67/02* (2013.01);
(Continued)

(58) Field of Classification Search
CPC ..... H04L 67/16; H04L 41/0853; H04L 67/02; H04L 67/06; H04L 67/12; H04W 4/70
(Continued)

(56) References Cited

U.S. PATENT DOCUMENTS

| 2014/0237096 A1* | 8/2014 | Yoon | H04L 41/5041 |
| | | | 709/223 |
| 2015/0149651 A1* | 5/2015 | Yasukawa | H04L 12/2809 |
| | | | 709/230 |
| 2015/0381776 A1* | 12/2015 | Seed | H04W 4/70 |
| | | | 709/203 |

FOREIGN PATENT DOCUMENTS

| EP | 1775657 A1 * | 4/2007 | ............. G06F 9/465 |
| EP | 1775657 A1 | 4/2007 | |
| JP | 2005-346408 A | 12/2005 | |

OTHER PUBLICATIONS

"Clustering WSDL Documents to Bootstrap the Discovery of Web Services" by Khalid Elgazzar, Ahmed E. Hassan, Patrick Martin Year: 2010).*
(Continued)

*Primary Examiner* — Sm A Rahman
(74) *Attorney, Agent, or Firm* — BakerHostetler

(57) ABSTRACT

A system is disclosed for publication and discovery of M2M/IoT services. An M2M gateway system receives resource descriptions from M2M/IoT devices. The gateway system creates for each received resource description an individual web services description language file (WSDL-I file) recording information about the resource. The gateway identifies groups of services with similar characteristics and generates for each identified group a web service description (Continued)

file (WSDL-G file) recording information regarding the group. The WSDL-G files are communicated to a service registry infrastructure (SRI). A consumer system queries the SRI for services satisfying particular criteria and receives WSDL-G files for groups of services that satisfy the criteria. The consumer system requests the WSDL-I files corresponding to a selected WSDL-G files from the gateway. The consumer system selects a particular service using the received WSDL-I files and uses the information in the WSDL-I file for the selected service to request the service from the corresponding M2M/IoT device.

24 Claims, 29 Drawing Sheets

(51) Int. Cl.
  *H04W 4/70* (2018.01)
  *H04L 12/24* (2006.01)
(52) U.S. Cl.
  CPC .............. *H04L 67/06* (2013.01); *H04L 67/12* (2013.01); *H04W 4/70* (2018.02)
(58) Field of Classification Search
  USPC ........................................................ 709/220
  See application file for complete search history.

(56) References Cited

OTHER PUBLICATIONS

"A Semantic Enhanced Service Proxy Framework for Internet of Things" by Sarfraz Alam and Josef Noll (Year: 2010).*

Web Services Description Language (WSDL) Version 2.0, Part 1: Core Language, Jun. 26, 2007, 103 pages.
Web Services Architecture, W3C Working Group, Note 11, Feb. 11, 2004, 98 pages.
Web Application Description Language, W3C Member Submission, Aug. 31, 2009, 21 pages.
Shelby, "Constrained RESTful Environments (CoRE) Link Format", Internet Engineering Task Force (IETF), RFC: 6690, Aug. 2012, 23 pages.
Shelby et al., "CoRE Resource Directory", draft-ietf-core-resource-directory-14, Jul. 2, 2018, 81 pages.
Rsdl, Wikipedia.org, WIKI, Jul. 11, 2018, 13 pages.
Rahman, Enhanced Sleepy Node Support for CoAP, draft-Rahman-core-sleepy-02, CORE WG, Feb. 24, 2013, 11 pages.
oneM2M_ TS-0001_V-0_4-2_Functional_Architecture_Baseline_Draft_March_4_2014_302_pages.
Office Action dated Feb. 21, 2018 for Japanese Application No. 2017-503566, 5 pages.
Li et al., "Conditional Observe in CoAP", draft-li-core-conditional-observe-04, Jun. 24, 2013, 32 pages.
Elgazzar et al., "DaaS: Cloud-based Mobile Web Service Discovery", Pervasive and Mobile Computing, Feb. 2013, 13, 67-84.
Elgazzar et al., "Clustering WSDL Documents to Bootstrap the Discovery of Web Services", Web Services (ICWS), 2010 IEEE International Conference, Jul. 5, 2010, pp. 147-154.
Alam et al., "A Semantic Enhanced Service Proxy Framework for Internet of Things", Green Computing and Communications (GREENCOM), 2010 IEEE/ACM International Conference on Cyber, Physical and Social Computing (CPSCOM), Dec. 18, 2010, pp. 488-495.
English Translation of JP Office Action dated Oct. 29, 2018 for JP Application No. 2017503566.

* cited by examiner

WSDL-I Template Configuration Panel

Please select which data items you would like to include in the WSDL-I template (only optional items are listed):

<availability.../> ☐

<geoLocation.../> ☐

<virtualPrice.../> ☐

Confirm

*FIG. 10A*

WSDL-G Template Configuration Panel

Please select which data items you would like to include in the WSDL-G template (only optional items are listed):

<group QoS.../> ☐

<GW PoC.../> ☐

Confirm

*FIG. 10B*

WSDL-G Template

```
<groupDescription>
    <groupIdentifier> </groupIdentifier>
    <groupFunction> </groupFunction>
    <numberOfMembers> </numberOfMembers>
    <groupStatistics> </groupStatistics>
    <locationRegion> </locationRegion>
    <inputAllowed> </inputAllowed>
    <outputExpected> </outputExpected>
    <GWAddress> </GWAddress>
</groupDescription>
```

*FIG. 11*

WSDL-G for Temperature

<groupDescription>

<groupIdentifier> TEM0909011 </groupIdentifier>

<groupFunction> Temperature </groupFunction>

<numberOfMembers> >20 </numberOfMembers>

<groupStatistics> 90% successful </groupStatistics>

<locationRegion> Amherst Town </locationRegion>

<inputAllowed> ZipCode, Coordinates </inputAllowed>

<outputExpected> temp-c, temp-f </outputExpected>

<gwAddress> 58.197.46.5:12345 </gwAddress>

</groupDescription>

*FIG. 17*

PUBLICATION AND DISCOVERY OF M2M-IOT SERVICES

CROSS REFERENCE TO RELATED APPLICATIONS

This application is a National Stage Application filed under 35 U.S.C. 371 of International Application No. PCT/US2015/041493, filed Jul. 22, 2015, which claims benefit under 35 U.S.C. § 119(e) of Provisional U.S. patent application No. 62/027,398, filed Jul. 22, 2014, the contents of which are hereby incorporated herein by reference in its entirety.

BACKGROUND

A service refers to a defined set of functionality or capabilities that is made available and accessible in a network environment. Devices and/or software applications transmit requests to the service which performs the desired function for the particular device or application.

Services are employed in a wide variety of technical environments. For example, services are used extensively in Web related technologies. A Web service with a particular function may be made available at a particular network address. Systems that require the particular functionality may transmit a request via the Web to the web service, which then performs the desired function. In an example scenario, a Web service may be employed by one system to exchange data with an otherwise incompatible system.

Services are also widely used in the context of machine to machine (M2M) and internet of things (IoT) technologies. Machine to machine (M2M) is a broad label that is used to describe technology that enables networked devices to exchange information and perform actions without the manual assistance of humans. The Internet of Things (IoT) refers to a scenario in which objects, including machines and components of machines, are provided with unique identifiers and the ability to automatically transfer data between objects over a network without requiring human-to-human or human-to-computer interaction. Services, which are sometimes referred to as resources in the M2M/IoT context, are used to provide access to M2M capabilities including those related to, for example, security, charging, and data management.

Recently, there has been interest in allowing Web services to access M2M/IoT services. In other words, there is growing interest in allowing Web applications to make use of functionality provided by M2M/IoT services. Existing technologies have proven inadequate in supporting the desired integration.

SUMMARY

Applicants disclose herein systems and methods for publishing and discovery of M2M/IoT resources or services. The disclosed systems and methods enable consumer systems, which may be Web based applications, to discover and access the functionality provided by M2M/IoT devices.

In an example embodiment, a first computing system which may be, for example, an M2M gateway system receives resource descriptions from M2M/IoT devices. Each of the resource descriptions describes a particular resource, which may be thought of as a service, that is accessible at the device or system from which the description was received. For example, the resource description may comprise information describing that the particular device is available to provide measurements or environmental conditions in the vicinity of the particular device. The resource description may be in any suitable format such as, for example, a reference to a resource directory (RD).

In an example embodiment, for each resource description that is received, the gateway creates an entry describing the resource. In an example embodiment, the gateway may create a separate or individual file for each resource, which may be referred to as a service. The information included in the file comprises information regarding how to access the particular resource. In an example scenario, the file may comprise information specifying when the resource is available, where the resource may be accessed, and a cost associated with accessing the resource. The individual files may be formatted in any suitable manner. In an example embodiment, the individual files may be formatted using web services description language (WSDL). The individual files formatted using web services description language may be referred to as WSDL-I files and may be stored on the gateway.

In an example embodiment, the gateway may be further programmed to group resources according to characteristics of the resources or services. For example, the gateway may be adapted to compare a newly received resource with previously created groups. The gateway determines based upon the comparison whether the resource can be categorized with an existing grouping of resources, or whether the particular resource belongs in a new grouping. In an example scenario where a resource relates to functionality for identifying the temperature, the gateway may determine that the resource may be paired with an existing grouping of resources that similarly provide temperature measurements. In an alternative scenario, the gateway may determine that the resource is not similar to any existing groups Where the gateway determines the resource relates to an existing group, the gateway adds the particular resource to the existing group. This may involve, for example, updating a file in which is stored information regarding the resources that are associated with the group. The information may comprise any information that is suitable to summarize the resources associated with the particular group. The file containing the summary information may be formatted in any suitable manner. In an example scenario, the file may be formatted as a web service description language file. In such a scenario, the file may be referred to as a WSDL-G file.

Where the gateway determines the resource does not relate to an existing group, the gateway may generate a new group. For example, the gateway may generate a new file in which is stored summary information regarding the new group. When the group and file is first created, there may be only one resource in the group. Over time, the file is updated as new resources are added to the group. In an example embodiment, the file may be formatted as a web service description language file.

According to another aspect of the disclosed embodiments, the gateway is programmed to publish information about the resources for which it has received information so that devices and systems can discover the existence of the resource and request use of the resource. In an example embodiment, the gateway communicates information regarding the defined groups of resources to a server computing system on which summary group information is maintained. For example, the gateway may communicate information to a service registry infrastructure (SRI) which operates as a registry for available resources or services. In an example embodiment, the gateway may transmit for each group a file containing summary information regarding the particular group of resources. Accordingly, when the gateway creates a new group in response to receiving a resource that does not fit an existing group, the gateway may communicate the corresponding file (WSDL-G) to the SRI. In instances where a group previously exists and a resource is added to the group file for the group, the gateway may communicate an update to the SRI to which the group file was previously communicated.

Once the information regarding the groups of resources has been published, the server system, i.e., the SRI, may receive requests to discover information about the groups of resources. For example, requests may be received from service consumer systems which may be any system that may have a need to use services. In an example scenario, the request may be received from a Web application. The requests may provide various parameters regarding the types of services or resources for which the system is searching. For example, the request may specify a query for services relating to a particular type of function or operation, in a particular area, and during a particular period of time. In an example scenario, the request may specify a query for resources that provide temperature in a particular portion of a manufacturing facility.

In response to the request, the resource server system, i.e., the SRI, uses the information in the query to identify groups of resources that may be responsive. The SRI may search through a plurality of WSDL-G files to identify one or more files that relate to groups of resources that are responsive to the particular request. The SRI returns to the consumer system the one or more WSDL-G files that the SRI determines are responsive to the query.

The consumer system parses the information associated with the identified groups of services and determines which of the groups are associated with services or resources that the consumer system may use. The consumer system identifies from the WSDL-G files a particular gateway that contains additional information about the services summarized in a particular WSDL-G file. The consumer system then generates and transmits to the identified gateway, a request or query for additional information regarding the particular group of services that the consumer system has determined it may use.

The gateway processes the query and identifies the particular group of services to which the request relates. The gateway identifies the particular resources included in the particular group identified in the request and retrieves the individual files (WSDL-I) corresponding to each of the identified resources. The gateway communicates the individual files, which may be, for example, WSDL-I files, to the consumer system.

The consumer system parses the received WSDL-I files and determines which service(s) it will access. The consumer system, having determined the particular service(s) it wishes to access, retrieves from the corresponding WSDL-I file(s) the particular parameters regarding accessing the particular service(s). For example, the consumer system may identify from the WSDL-I file the particular system at which the service/resource may be accessed and the particular manner and times for accessing the resource. The consumer system generates and communicates a request to use the resource to the identified system.

The identified system, which may be an M2M/IoT system, provides the service as requested. For example, where the service relates to providing temperature readings, the identified system may communicate temperature readings to the consumer system at predetermined intervals.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted.

FIGS. 10A and 10B depict example user interfaces for customizing WSDL-I and WSDL-G templates.

FIG. 11 is a diagram depicting an example WSDL-G template.

FIG. 17 is a diagram depicting an example WSDL-G template.

DETAILED DESCRIPTION OF ILLUSTRATIVE EMBODIMENTS

Applicants disclose herein systems and methods for publishing and discovery of M2M/IoT resources or services. The disclosed systems and methods enable service consumer systems, which may be Web service systems or Web applications, to discover and access the functionality provided by M2M/IoT devices.

Example Service Architecture

Figure 1:
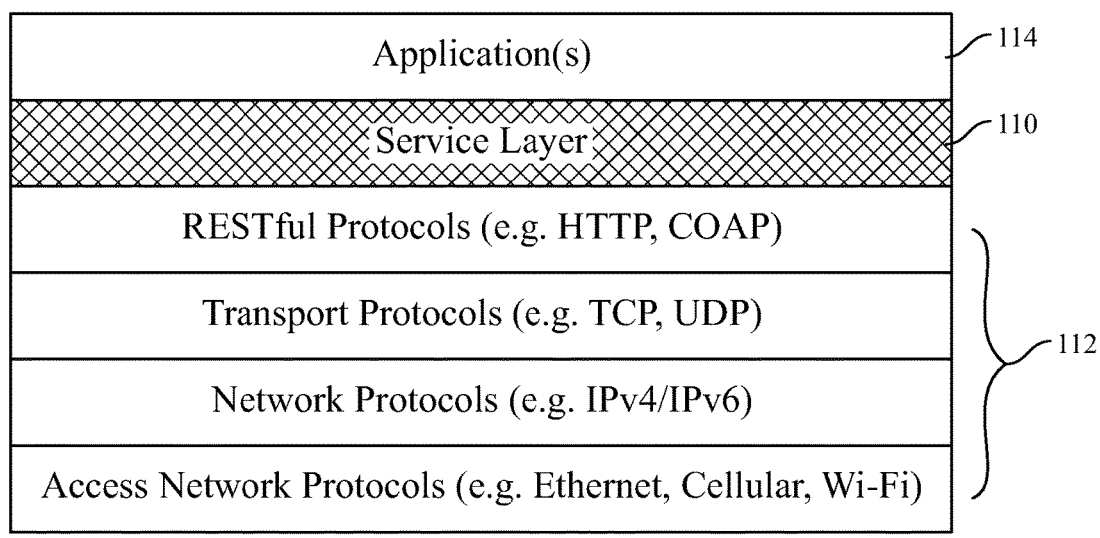
FIG. 1 depicts an example protocol stack depicting relative positioning of a service layer.

From a network and architectural perspective, services may be thought of as existing in a "service layer." FIG. 1 provides a diagram of an example protocol stack illustrating the relative location of a service layer. As shown, the service layer 110 sits on top of various transport and network layers 112. This allows the services in the services layer to make use of the capabilities in the network layer in providing the services. The services layer may be thought of as existing below a client application layer 114. Client applications make requests to the services in the services layer in order to access the functionality made available by the services. Accordingly, the service layer operates as middleware that provides access to the functions and capabilities exposed by the services.

Figure 2:
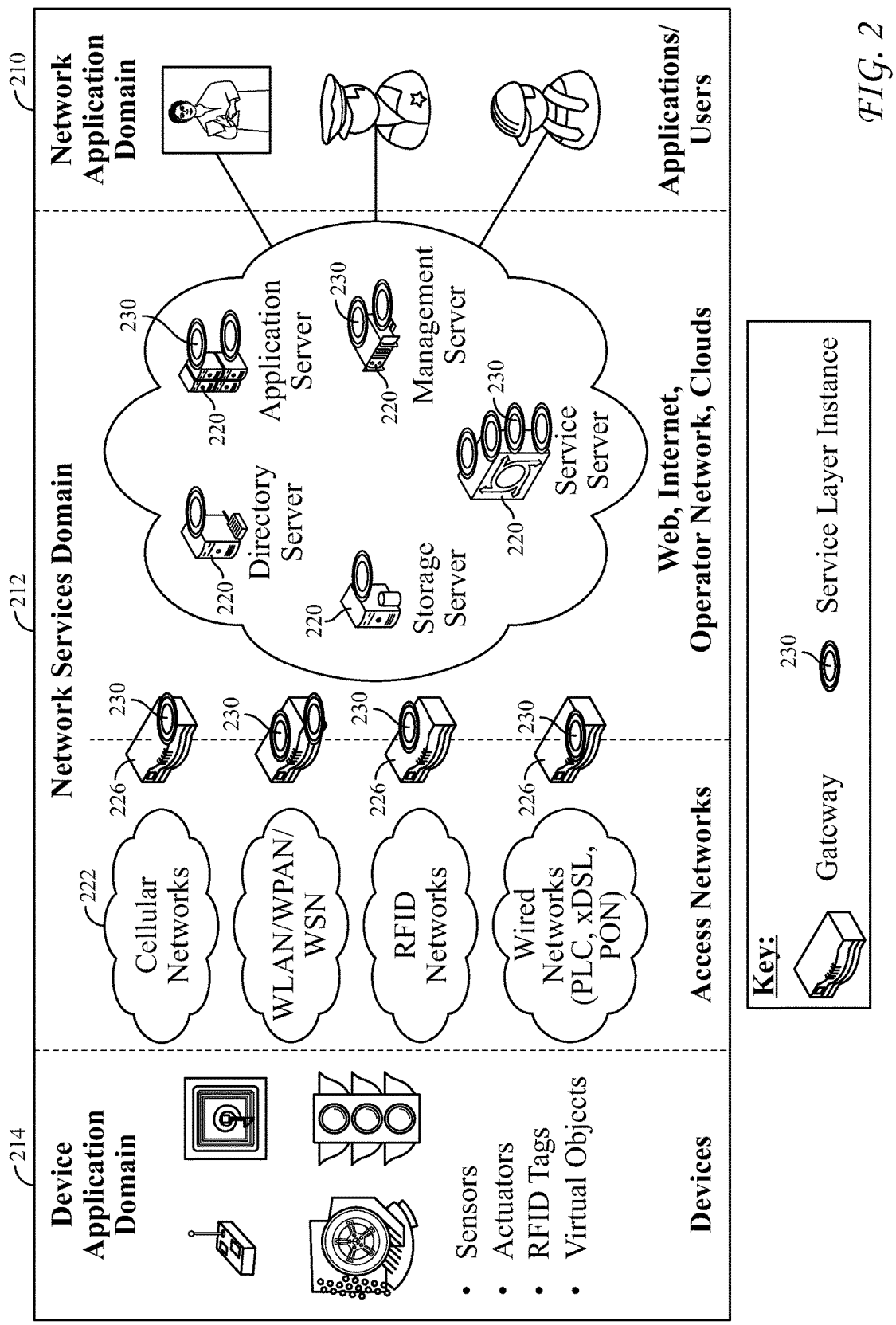
FIG. 2 depicts an example service layer deployment in a network.

FIG. 2 illustrates an example network topography having instances of service layers deployed therein. Referring to FIG. 2, user applications existing in network application domain 210 may require that particular functions be performed. The user applications may execute on a device 30 which may be, for example, a system such as that described below in connection with FIGS. 26A-D. By way of example, a user application devoted to managing devices in a network may require information about the current status of devices. In another example, a user application may be a Web application and may need to communicate data to another application that uses another data formatting standard.

The applications communicate requests for particular services to network services domain 212. As shown, network services domain 212 comprises various network nodes 220. Network nodes 220 are network addressable entities within a network. A network node 220 may be a physical item such as, for example, a device, gateway, or server, or may be a virtual entity such as, for example, a virtual machine created using virtualization software such as, for example, VMware. In the example embodiment of FIG. 2, network nodes 220 comprise various server types including, for example, directory server, application server, storage server, management server, and service server. Network nodes 220 may be implemented by any suitable computing system such as, for example, that described below in connection with FIG. 26D. In the embodiment of FIG. 2, access to various networks 222 is provided via gateways 226. Gateways may be implemented by any suitable computing system such as, for example, that described below in connection with FIGS. 26C or 26D.

Servers 220 and gateways 226 have service layers 230 thereon. Service layers 230 are software middleware layers that support value-added service capabilities through a set of application programming interfaces (APIs) and underlying network interfaces. Requests from applications in network application domain 210 to perform a particular service function are routed to and received at particular service layers 230. The service layers 230 process the requests and return the results of the requested service to the requesting application. Network nodes that host a service layer supporting one or more service capabilities are referred to as a service node.

Referring to FIG. 2, the services in services layers 230 may also be requested by device applications such as those that exist in device application domain 214. Accordingly, where a particular device such as, for example, a sensor or actuator, requires that a particular functionality be performed, the devices may transmit a request to the appropriate service existing in one of the services layers in network services domain 212. The service layers 230 process the requests and return the results of the requested service to the requesting device. The devices in device application domain 214 may be implemented using any suitable computing system such as, for example, those described in connection with FIGS. 26A-D below.

In some instances, a service within the network services domain may require functionality provided by one of the other services. Accordingly, a service in a service layer 230 may transmit a request to a service existing in another service layer 230. When the service that received the request completes its processing, it transmits a response to the requesting service.

Service layers 230 may be any type of service layer. For example, one or more of service layers 230 may be an IP Multimedia Subsystem (IMS) service layer specifically targeted to providing multimedia services for mobile network devices. By way of further example, one or more of service layers 230 may be an M2M/IoT service layer. The M2M/IoT service layer is an example of one type of service layer specifically targeted towards providing value-added services for M2M/IoT type devices and applications. Recently, several industry standards bodies (e.g., ETSI M2M, oneM2M, and OMA LWM2M) have been developing M2M/IoT service layers to address the challenges associated with integration of M2M/IoT types of devices and applications into deployments such as the Internet/Web, cellular, enterprise, and home network.

An M2M service layer can provide applications and devices access to a collection of M2M centric capabilities supported by the service layer. A few examples include security, charging, data management, device management, discovery, provisioning, and connectivity management. These capabilities are made available to applications via APIs which make use of message formats, resource structures, and resource representations defined by the M2M service layer.

The purpose and goal of oneM2M is to develop technical specifications which address the need for a common M2M service layer that can be readily embedded within various hardware and software, and relied upon to connect a wide variety of devices in the field with M2M application servers worldwide.

Figure 3:
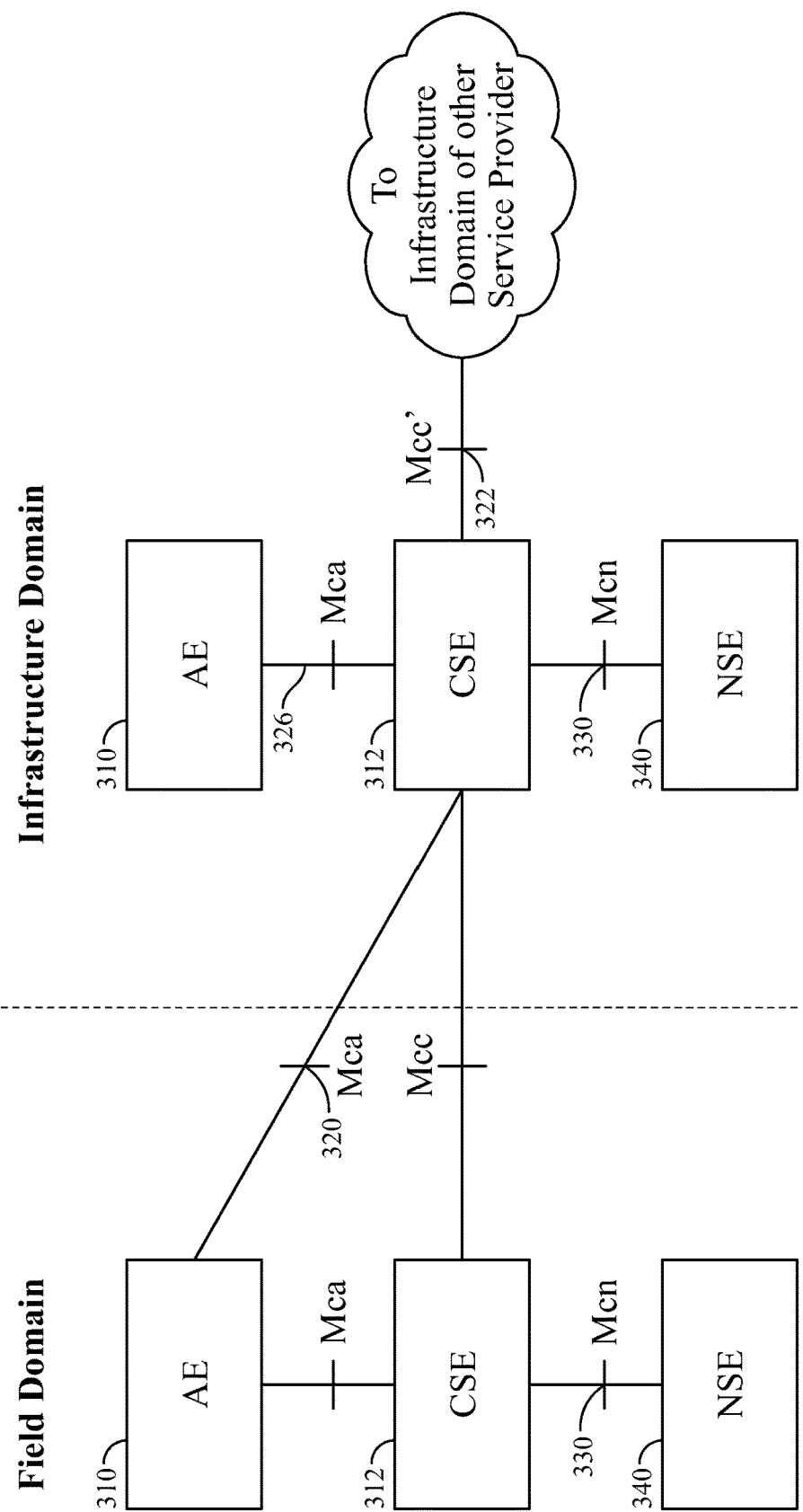
FIG. 3 is a diagram depicting an example oneM2M architecture.

FIG. 3, illustrates example basic oneM2M architecture. As shown, the oneM2M architecture comprises application entities (AEs) 310 which provide application logic in oneM2M solutions. The oneM2M common services layer supports a set of Common Service Functions (CSFs) (i.e., service capabilities). An instantiation of a set of one or more particular types of CSFs is referred to as a Common Services Entity (CSE) 312 which can be hosted on different types of network nodes (e.g., infrastructure node, middle node, application-specific node). Service functions are exposed to other entities through reference points Mca 320 and Mcc 322. Reference point Mcn 330 is used for accessing underlying network service entities. Network services entities (NSEs) 340 provide services to the CSEs. Examples of M2M services include device management, location services, and device triggering. The underlying NSE may be, for example, a 3GPP based network.

oneM2M applications are typically implemented using the representational state transfer (RESTful) architecture. In such instances, the CSFs are represented as a set of RESTful "resources." A resource is a uniquely addressable entity in the architecture having a representation that can be manipulated via RESTful methods such as Create, Retrieve, Update, and Delete. These resources are made addressable using Universal Resource Identifiers (URIs). A resource may contain child resource(s) and attribute(s). A child resource is a resource that has a containment relationship with a parent resource. The parent resource representation contains references to its child resources(s). The lifetime of a child-resource is limited by the parent's resource lifetime. Each resource supports a set of "attributes" that store information about the resource. Applicants disclose herein systems and methods to publish information about M2M/IoT resources/services so as to make them visible to systems such as Web applications.

Figure 4:
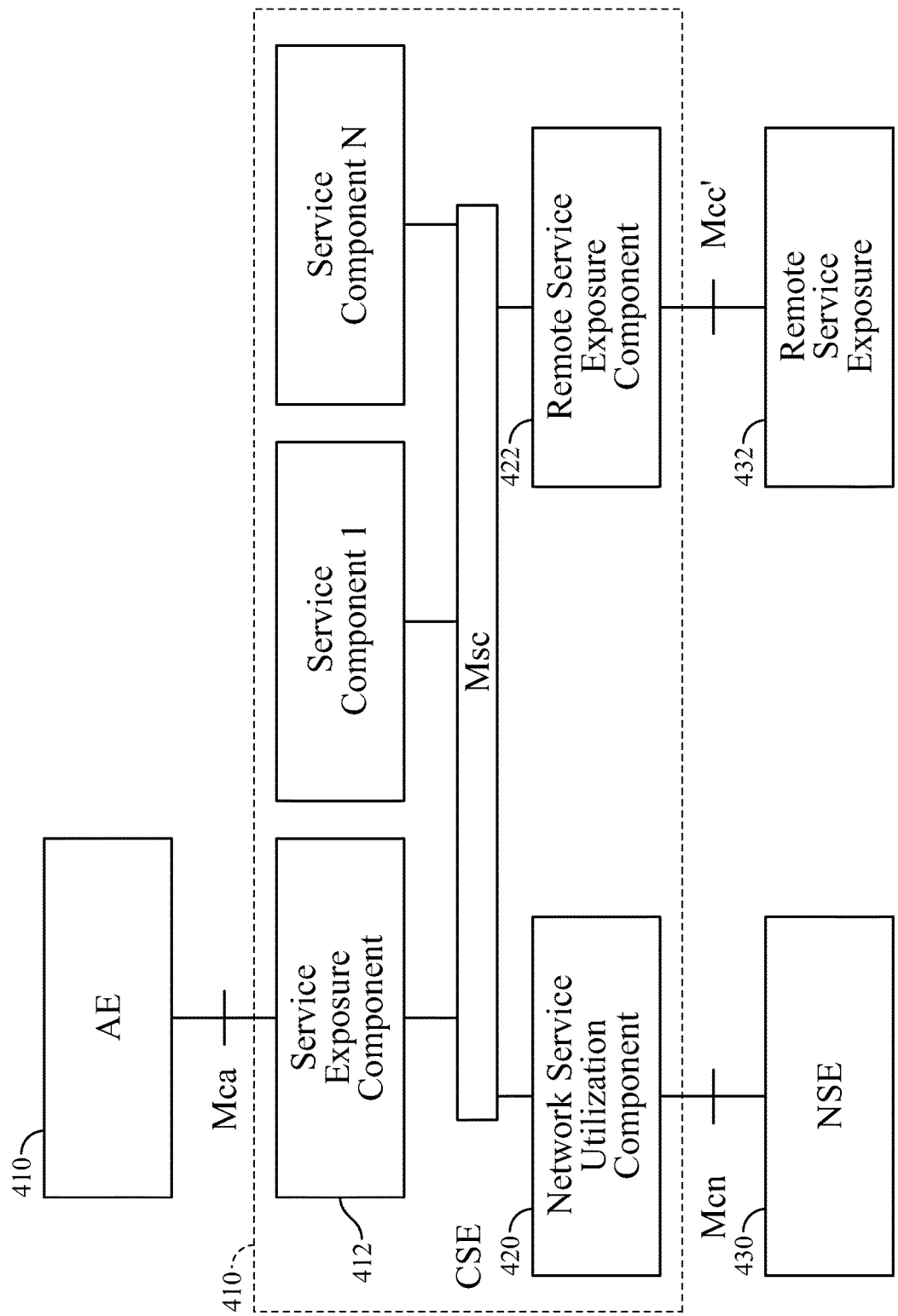
FIG. 4 is a diagram depicting an example oneM2M architecture.

FIG. 4 depicts a diagram comprising components of an example M2M service architecture. The M2M service architecture augments the oneM2M functional architecture described above in connection with FIG. 3 by providing AEs with access to M2M services and M2M service providers. As shown in FIG. 4, AEs 410 may be communicatively coupled with service exposure components 412 that have been grouped together in CSE 414. The service exposure components 412 are communicatively coupled with network service utilization component 420 and remote service exposure component 422. Network service utilization component 412 provides access to services provided via network service entity 430. Remote service exposure component 422 provides access to services from remote M2M environments 432.

Web Service Technology

Web Service (WS) refers to a method of implementing software systems that are designed to support interoperable interactions between computers over a network. WS provides a standard means of interoperation between software applications running on a variety of platforms and frameworks. For example, WS may employ remote procedure calls (RPC) so that a first program can request a service from a second program located on a different computer in a network. WSs may be implemented using extensible markup language (XML) and may be characterized by their great interoperability and extensibility, as well as their machine-readable descriptions. WSs can be combined in a loosely coupled way to achieve complex operations such that programs providing simple services can interact with each other to deliver sophisticated value-added services.

Web Service Description Language (WSDL)

Web service description language (WSDL) is an XML-based interface description language that is used for describing the functionality offered by a WS. A WSDL description of a WS (also referred to as a WSDL file) provides a machine-readable description of how the service can be called, what input parameters it expects, what output it delivers, and what transport protocol it uses, etc. According to an aspect of the disclosed systems, WSDL files may be published by service providers to the network so that other software applications, which may be referred to as service consumers, can discover the available WSs and easily determine how to access those WSs based on the information included in WSDL files.

An example WSDL template that employs existing WSDL version 2.0 formatting is shown below. As illustrated, existing WSDL formatting provides for identifying information relevant to the service including, for example, the data a service uses, the functionality provided by the service, the manner in which the service is provided, and where the service may be accessed.

```
<description...">
        <!-- What data a WS uses -->
    <types/>
        ......
    </types>
    <!-- What the WS can do -->
    <interface>
        <operation>
            <input>
                ......
            </input>
            <output>
                ......
            </output>
        </operation>
    </interface>
    <!-- How the WS is provided -->
    <binding/>
        ......
    </binding>
    <!-- Where to access the WS -->
    <service/>
        <endpoint ......>
        ......
    <service/>
</description>
```

As illustrated by the above example, WSDL version 2.0 supports several elements that are used to describe Web services. More particularly, existing WSDL templates support the following elements which are used to describe Web services:

<Types> element describes the data that is used by a particular service. The XML Schema Definition (XSD) is used for this purpose.

<Interface> element defines the operations (as defined in <operation> element as a part of <interface>) that can be performed using a particular service. The operation information may comprise the specific input, output, and fault messages that may be passed in connection with the service. This formatting of the data interchange with a service may be referred to as Message Exchange Pattern (MEP) in WSDL 2.0.

<Binding> element defines how a WS client or consumer can communicate with the WS. The binding transport protocol may be any of several different protocols including, for example, HTTP for REST WS or SOAP (XML+HTTP) for traditional WS.

The <service> element associates an address for a WS (specified in the <endpoint> element) with a specific interface and binding.

Figure 5:
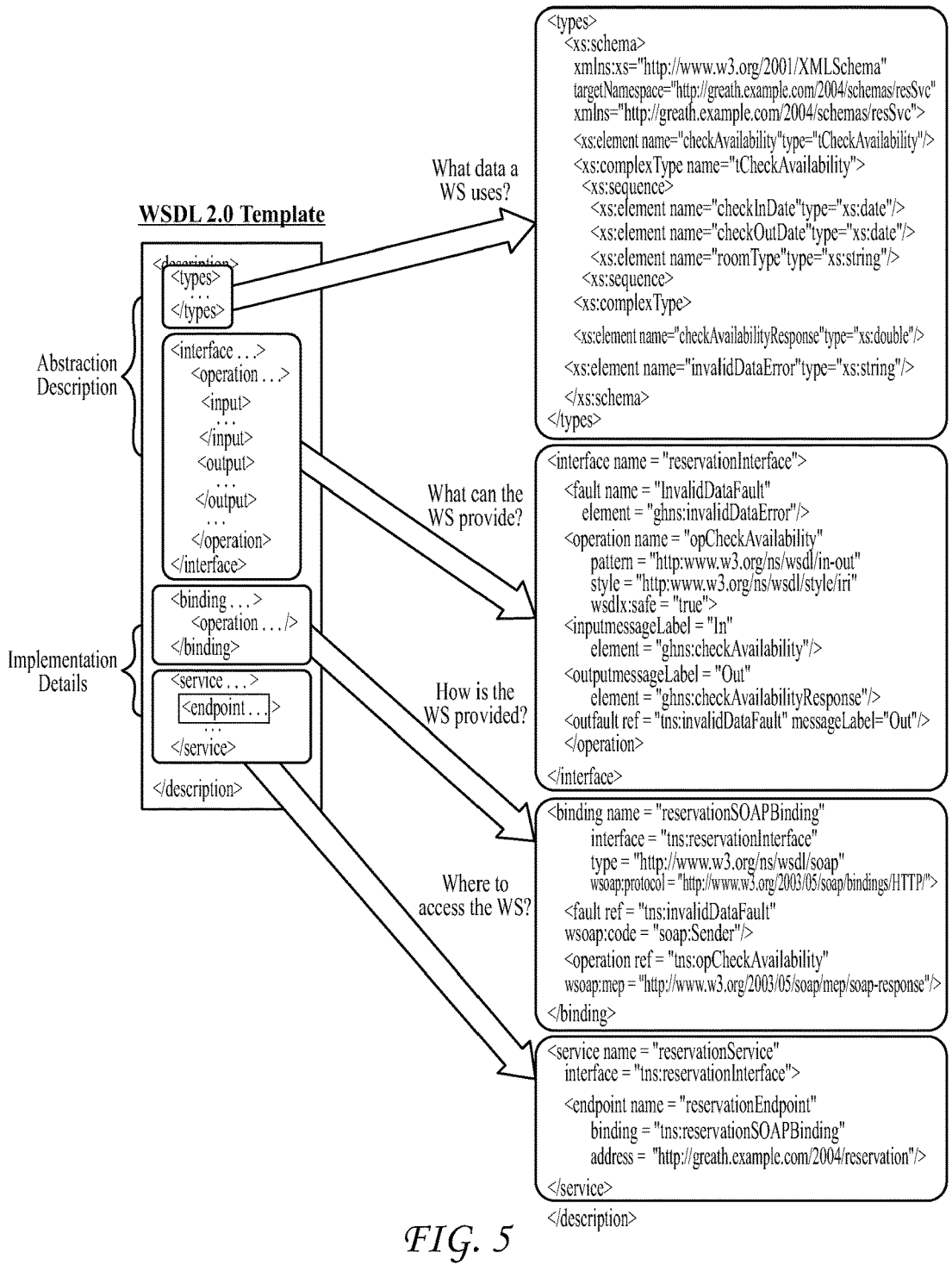
FIG. 5 is a diagram depicting an example WSDL file.

Typically, a WSDL file is generated for each Web service. FIG. 5 illustrates an example WSDL file that corresponds to a hotel reservation service. As illustrated in FIG. 5, the <types>, <interface>, <binding>, and <service> WSDL elements are used to define the operations performed by the reservation service, the data used by the reservation service, how to communicate with the reservation service, and where the reservation service may be accessed.

Message Exchange Pattern (MEP) in WSDL

WSDL may be used to define a WS in service oriented architecture (SOA). An SOA is an architectural style where software components that provide pieces of functionalities are encapsulated as agnostic services and communicate with each other via messages. Where WSDL is used in support of SOA, the WSDL defines: 1) the messages that a service is able to send and receive; and 2) how the messages are relevant by grouping them into operations. WSDL 2.0 introduces a generic mechanism to describe operation types, called Message Exchange Patterns (MEP). An MEP defines the operation type of a WSDL operation by employing a predefined template that defines the order in which messages that belong to the same operation are exchanged. The following eight MEPs are defined in WSDL 2.0.

In-Only: The service receives a message.

Robust In-Only: The service receives a message and, in case of a fault, returns a fault message.

In-Out: The service receives a message and returns a response message.

In-Optional-Out: The service receives a message and optionally returns a response message.

Out-Only: The service sends a message.

Robust-Out-Only: The service sends a message and, in case of a fault at the partner service, receives a fault message.

Out-In: The service sends a message and receives a response message.

Out-Optional-In: The service sends a message and optionally receives a response message.

All of these patterns describe the message exchange between the service and a partner (i.e., a service consumer) remotely calling the service.

Existing Service Publishing and Discovery Process

Figure 6:
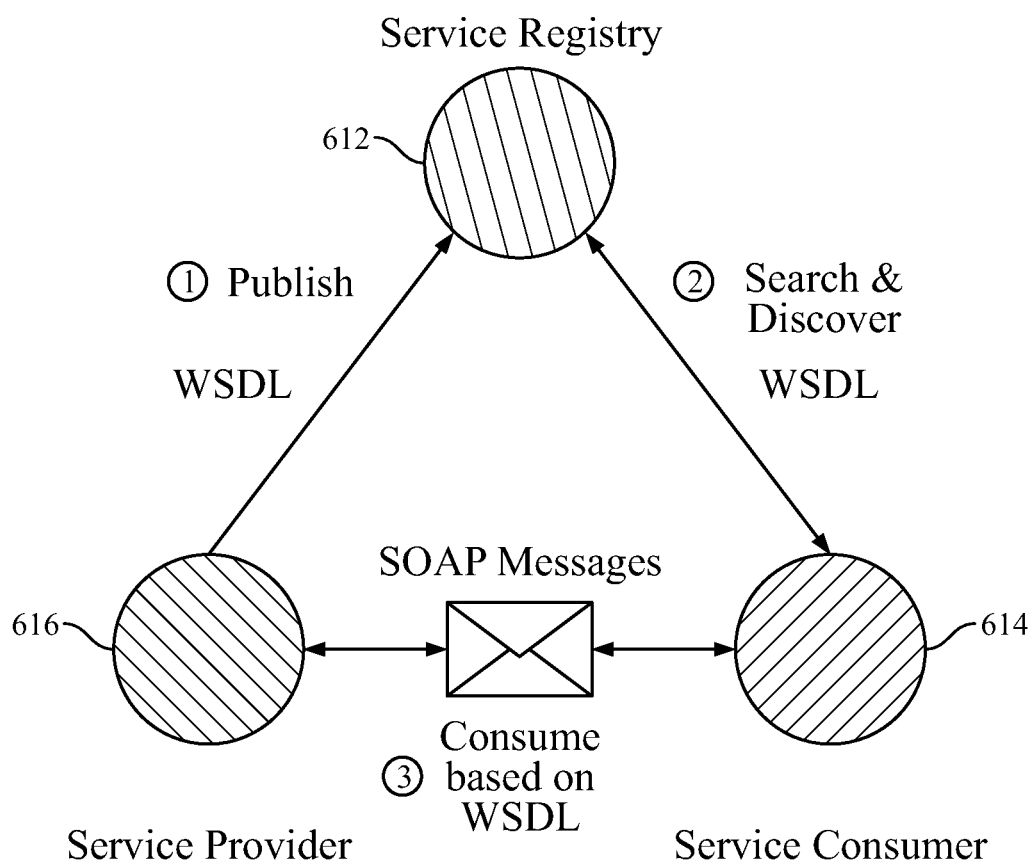
FIG. 6 is a diagram depicting a flow for service publishing and discovery.

FIG. 6 depicts a logical flow of existing service publishing and discovery processing. Existing WS publishing and discovery processing involves processing by and communications between three primary systems: service provider systems 610; service registry systems 612; and service consumer systems 614. A service provider system 610 operates to provide access to particular services. As illustrated by flow 1 in FIG. 6, the service provider system 610 publishes a description for each of the services accessible via system 610. The publication processing may involve communicating a description of the service to the service registry system 612. The service description may be formatted as a WSDL file.

The service registry system 612 may leverage a service registry infrastructure (SRI), which may be, for example, Universal Description Discovery and Integration (UDDI). The service registry system or SRI 612 stores the service description information. In an example embodiment, the SRI 612 stores the WSDL files for each service that is published to the SRI 612.

As illustrated by flow 2 of FIG. 6, service consumer system 614 communicates requests to SRI 612 in order to discover Web services. The requests may include parameters specifying the types of services requested. In response to the request, the SRI 612 forwards the WSDL files for the services corresponding to parameters specified in the request to service consumer system 614.

The service consumer system 614 uses the information from the received WSDL file to format requests to access the service provided by the service provider 610. For example, service consumer system 614 uses the information in the WSDL file to identify that the service provider system 610 provides access to the particular service and transmits a corresponding request to the system 610.

Alternative approaches to service publication and registry have been attempted. For example, service publication and discovery may be performed using general search engines, special WS advertisement websites, and/or propagating WSDL files on the web in a pure distributed manner.

WS Semantics

WSDL provides a means to describe services along with the related inputs and outputs, endpoints, and other information related to a service. Even with this information, a computing system processing a WSDL file may require human assistance to fully process all of the associated information including, for example, meaningful identifiers and textual information in the interface description. Accordingly, some existing efforts such as OWL-S have focused on adding semantic annotations to WSDL files.

Web Application Description Language (WADL) and RESTful Service Description Language (RSDL)

Existing publication and discovery systems may employ technologies other than WASDL. For example, services might be described using the web application description language (WADL) which may be used to describe representational state transfer (REST) style web applications. WADL is a description language that is typically employed to describe HTTP-based Web applications which follow the REST or Resource-Oriented Architectural (ROA) style in the sense that the "resource" is the central concept. WADL was submitted to the World Wide Web Consortium (W3C) by Sun Microsystems on 31 Aug. 2009, although it is has not been standardized and has not been widely adopted.

By comparison, WSDL version 2.0 is a formal specification and has become a de facto standard for describing and defining WSs. WSDL is a service-oriented description language. WS has become one of the most popular technology to implement Service-Oriented Architecture (SOA), where "service" is the central concept. Existing WSs can be grouped into two types: 1) Big WS, which is the traditional type, and 2) RESTful WS. The two types are different in that big WS uses SOAP (HTTP+XML) as transport protocol and does not follow REST design principle. For example, an "add" operation is binding to a "GET" operation in HTTP. By comparison, RESTful WS follows the REST design principle, including: 1) using HTTP methods explicitly, 2) being stateless, 3) exposing directory structure-like URIs, and 4) transferring XML, JavaScript Object Notation (JSON). It is worth noting that RESTful WS based systems may still be SOA rather than ROA (in which "resource" is the central concept).

RESTful Service Description Language (RSDL) is also a machine-readable XML description for RESTful WS. RSDL is intended to simplify the reuse of WSs that are based on the HTTP architecture of the web. However, RSDL is specifically designed for describing RESTful WS while the latest WSDL 2.0 can already achieve this purpose. In addition, similar to WADL, RSDL is not a standardized language for describing WS, compared to WSDL 2.0 which is being widely adopted.

M2M Systems and M2M Services

Figure 7:
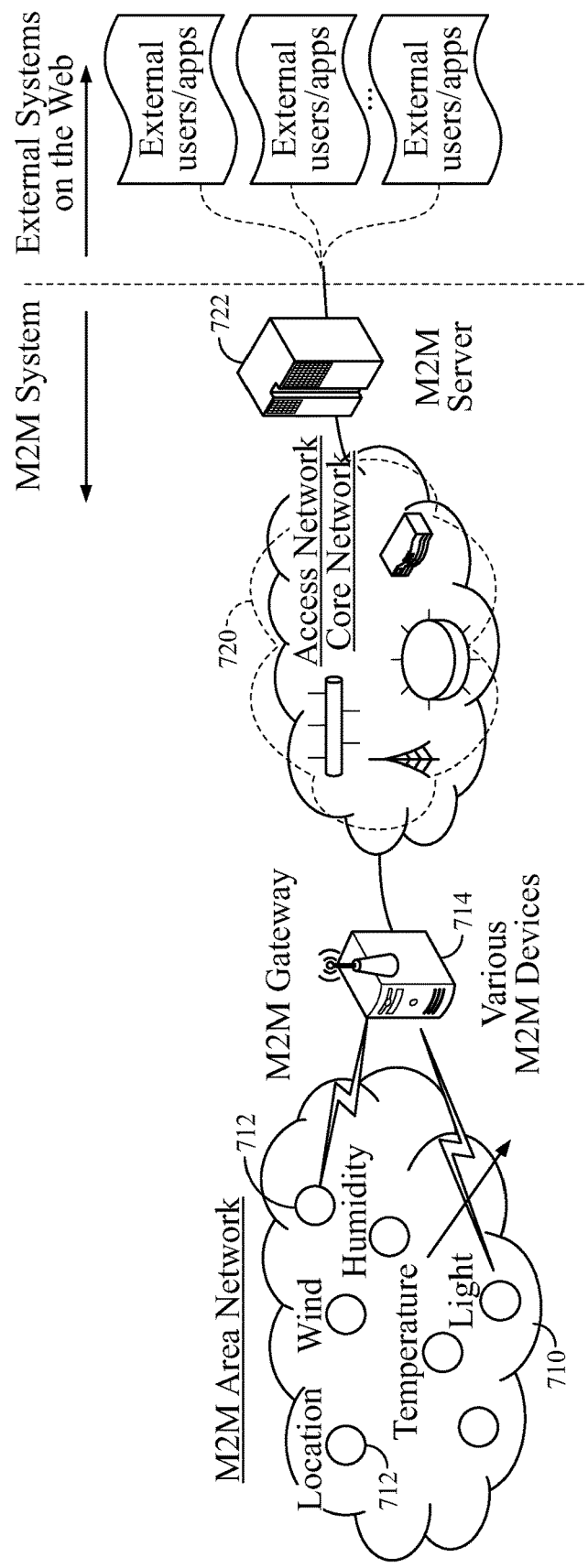
FIG. 7 is a diagram depicting a communication path between M2M devices and Web services.

FIG. 7 is a network diagram depicting the communication path between Web service systems and M2M system resources. As shown, an M2M area network 710 provides connectivity between M2M end devices 712 and M2M gateways (GWs) 714. M2M area network 710 may be any suitable network including, for example, networks employing personal area network technologies such as IEEE 802.15, Zigbee, Bluetooth, etc. The M2M devices 712 may be resource-constrained devices that provide services such as reporting sensory information such as humidity or temperature, or that function as controllers such as light switches. The M2M end devices 712 communicate with the M2M GW 714, which communicate over a core network 720 with M2M server 722. M2M server 722 interfaces with external networks and applications 730. External applications 730 may be consumers of services and may access services provided by devices 712 via M2M server 722.

Resource Observation in CoAP Protocol

Constrained Application Protocol (CoAP) is an application protocol specifically developed for use with constrained nodes/networks such as wireless sensor networks. CoAP has attracted ever-increasing attention and has become a promising messaging protocol for IoT systems. Besides supporting RESTful resource operations between a CoAP server and a CoAP client, CoAP protocol also defines a subscription/notification mechanism referred to as "Observe" that allows for automatically pushing resource representations from a CoAP server (i.e., service providers) to interested CoAP clients (i.e., service consumers).

Figure 8:
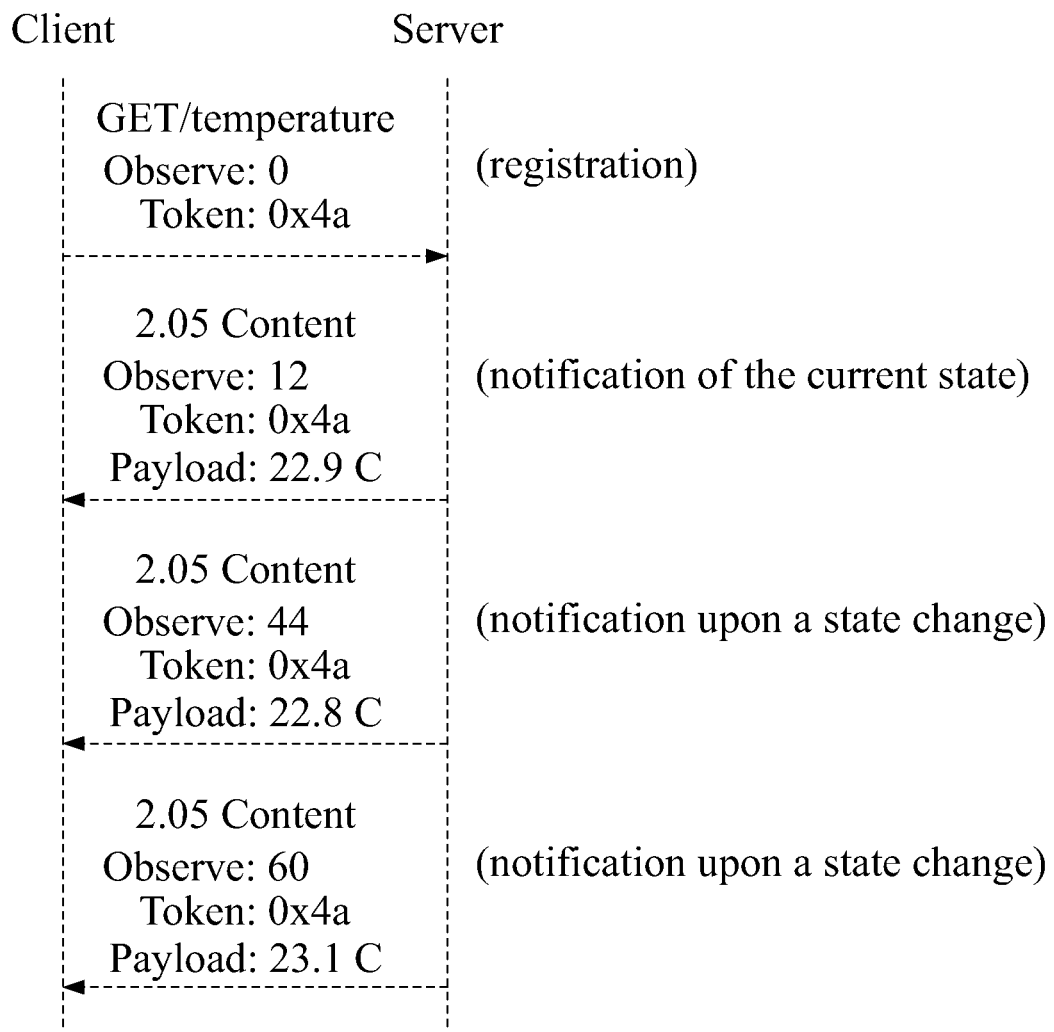
FIG. 8 is a diagram depicting an Observe operation recorded using CoAP.

FIG. 8 illustrates an example of the Observe operation recorded using CoAP. A CoAP client first sends a GET request with an Observe option to a CoAP server to register for an interested resource. The client receives three notifications from the CoAP Sever, with the first notification being sent upon registration and the other two notifications being issued when the state of the resource changes. Notifications echo the same token contained in the original GET request from the CoAP client, so the CoAP client can easily correlate them to the original GET request.

Limitations of Existing Publication and Discovery Processing

Many existing software systems (such as enterprise application systems) have been implemented in a distributed and loosely-coupled way by using WS technology. There is now interest in extending existing methodologies in order to leverage and/or integrate emerging M2M/IoT services. Accordingly, developing systems and methods to smoothly integrate those emerging M2M services into existing WS-based software systems is a fundamental issue to be resolved. Developing such systems is complicated by the divergent technologies being used in emerging systems. For example, many existing systems employ SOA, while emerging systems typically make use of ROA.

As noted in the above discussion, there are several different service/resource description languages (e.g., WSDL, WADL, or RSDL) which may be used to describe a service for purposes of service publication and discovery. Each of these languages has limitations that prevent efficient publication and discovery of M2M services by Web based systems. The discussion herein focuses on WSDL because it is the most widely used of the description languages. However, it will be appreciated that other description languages may have similar limitations and may be enhanced similarly as described below in connection with WSDL to provide the disclosed systems and methods.

Existing WSDL Publishing/Discovery Architecture Is Inappropriate for IoT Systems In the IoT context, there are typically a large number of devices (e.g., sensors) providing resources (such as temperature, humidity, etc.). Some estimate that there will be 50 billion IoT devices by 2020. Furthermore, in IoT networks, even for devices of a similar type, the devices may have numerous variations. For example, devices that provide a similar functionality may use different software, created by different manufacturers, etc. IoT devices may not always be accessible due to periods during which devices may become inactive, i.e., sleep. IoT devices are also subject to dynamic configuration changes (e.g., adjusting sleep schedule, changing input and output formats, etc.) over time including how the devices may be accessed.

As noted above in connection with FIG. 6, existing methods of publishing M2M and IoT resources/services involves each service provider generating a WSDL file corresponding to each of the resources and transmitting each of the WSDL files for each of the resources to a service registry. But this existing processing is less than optimal in the IoT context. For example, direct interactions between a service provider, i.e., IoT device, and a service registry which are needed to generate, publish, and updating WSDL files, is challenging for resource-constrained devices and networks. Many IoT devices have limited computing processing capacities and limited power budgets, both of which restrain communications with an SRI.

By way of further example, the large number of WSDL files from IoT devices may easily overwhelm the SRI. As noted above, there are likely to be very many IoT devices, each having one or more resources or services. Per current practice, each resource results in a separate WSDL file being generated and communicated to the SRI. The large number of WSDL files being communicated to and stored on the SRI may easily overwhelm an SRI and lead to long query delays.

Frequent updates to represent changes in device configurations could degrade SRI performance using current publication and discovery procedures. IoT devices are adapted to dynamically adjust their configurations. For example IoT devices sometimes adjust their configurations to preserve energy. Such changes in configuration optimally would be represented in a WSDL file corresponding to resources on the device. Optimally, such changes in configuration should be represented in the corresponding WSDL file located on the SRI. Unfortunately, the frequent updates that would be required in order to update an SRI with changes in configurations add significantly to processing overhead and performance of the SRI.

Existing methods for service publishing and discovery fail to account for IoT device availability. As noted above, some IoT devices are subject to periods of unavailability due to, for example, the particular device going to sleep. Accordingly, per current practices, even though a service consumer system may locate a service via an SIR, the consumer system may not be able to access the particular service provider device because the device may be unavailable, i.e., sleeping.

Applicants have also noted that in addition to the inadequacies of existing process of publication and discovery of resources, the web service description language (WSDL) that is presently used to describe resources, fails to accommodate the characteristics of IoT devices. For example, the existing WSDL template lacks features or elements for adequately describing characteristics of M2M services. It is frequently the case that for a given service, three data items are known: where the service may be accessed; when the service may be accessed; and a cost associated with accessing the service. In some ways, a service provided by a M2M/IoT device is not unlike a service provided by a pizza restaurant in that the restaurant may have associated three items of data: where—a pizza restaurant may be located at 781 3rd Ave.; when—the pizza restaurant may be open between 9 AM and 6 PM on Monday through Friday; and how much—a pizza slice is $3.5 per slice. Just as it is useful when advertising a pizza restaurant to inform potential customers as to where, when, and how much, with respect to M2M and IoT and publishing service information, Applicants have noted that it is useful to publish information specifying where, when, and how much. However, existing WSDL template elements fail to adequately support publication of this information.

With respect to "where" a service is located, the concept of utilizing services in in proximity to a particular location is common in IoT systems. In an example scenario, it may be desired to locate a temperature sensor device in proximity to a light/smog sensor in order to detect a possible fire event. In another example scenario, it may be desired to locate services in close proximity so as to reduce the network traffic involved in accessing the particular service. Existing WSDL template lacks elements designated for publishing and discovering positional information.

With respect to "when" a service may be accessed, IoT devices and the services/resources they provide are subject to periods of unavailability. For example, it is not atypical for an IoT device to undergo periods where the device is asleep. Attempts to access services during the period unavailability will likely result in a failure of service. Existing WSDL templates lack elements designated for publishing and discovering of temporal information related to services. Existing WSDL templates and processing assume that services are always available.

With respect to "how much" a service may cost, decisions regarding which service to use may be made, at least in part, on the associated cost for accessing the service. Current WSDL version 2.0 template does not support service providers to specify a price (which is not necessarily to be real money, e.g., using virtual currency) for using its service in the service description.

The existing WSDL template also lacks features for describing new service provisioning or interaction patterns in M2M systems. The existing WSDL 2.0 specification defines eight message exchange patters (MEPs). Many of the defined MEPs describe the interaction between a service provider and a service consumer in a single transaction. The defined MEPs lack the ability to describe multiple transactions or interactions over a period of time.

Existing WSDL templates also do not support describing new interaction patterns such as, for example, the "Observe" operation in CoAP protocol. As described above in connection with FIG. 8, in connection with an Observe operation, a CoAP client receives a number of notifications over a specified period of time after registration with a CoAP server. The existing WSDL lacks structure for adequately describing such features.

Enhanced Publication and Discovery of M2M/IoT Services

Applicants have developed new systems and methods for publication and discovery of services provided by M2M/IoT devices. The disclosed systems and methods are especially useful with respect to constrained M2M/IoT devices. According to an aspect of the disclosed embodiments, IoT devices communicate resource descriptions to an M2M GW. The GW operates as an intermediary node. For each received resource, the GW wraps the resource in an "individual" WSDL file which is referred to as a WSDL-I file, where the "I" signifies the file relates to an individual service. The GW also creates groups of services that share some characteristics and records the groupings in WSDL files which may be referred to as WSDL-G files, where the "G" signifies the file relates to a group of services. The GWs publish the grouped WSDL files (i.e., WSDL-G files) to the SRI. The GWs do not typically publish the individual WSDL-I files and thereby reduce overhead resulting from the WSDL process. Service consumer systems, which may be, for example, Web service applications, queries the SRIs for services satisfying particular parameters. The SRIs return WSDL-G files corresponding to the query parameters. The service consumer systems use the information in the WSDL-G files to locate the appropriate GW and to request particular information regarding the services specified in a particular WSDL-G file. In response, the GW returns the WSDL-I files corresponding to the particular WSDL-G file. The service consumer system uses the information in the received WSDL-I files to select one or more services and to format request to receive the selected services.

The introduction of the GW as an intermediary in the publishing and discovery processing, has the benefit of reserving WSDL updates, which may be frequent, to within the M2M area network. The GW need only publish WSDL-G files to the SRI, which reduces communication overhead with the SRI and computation overhead within the SRI.

Figure 9:
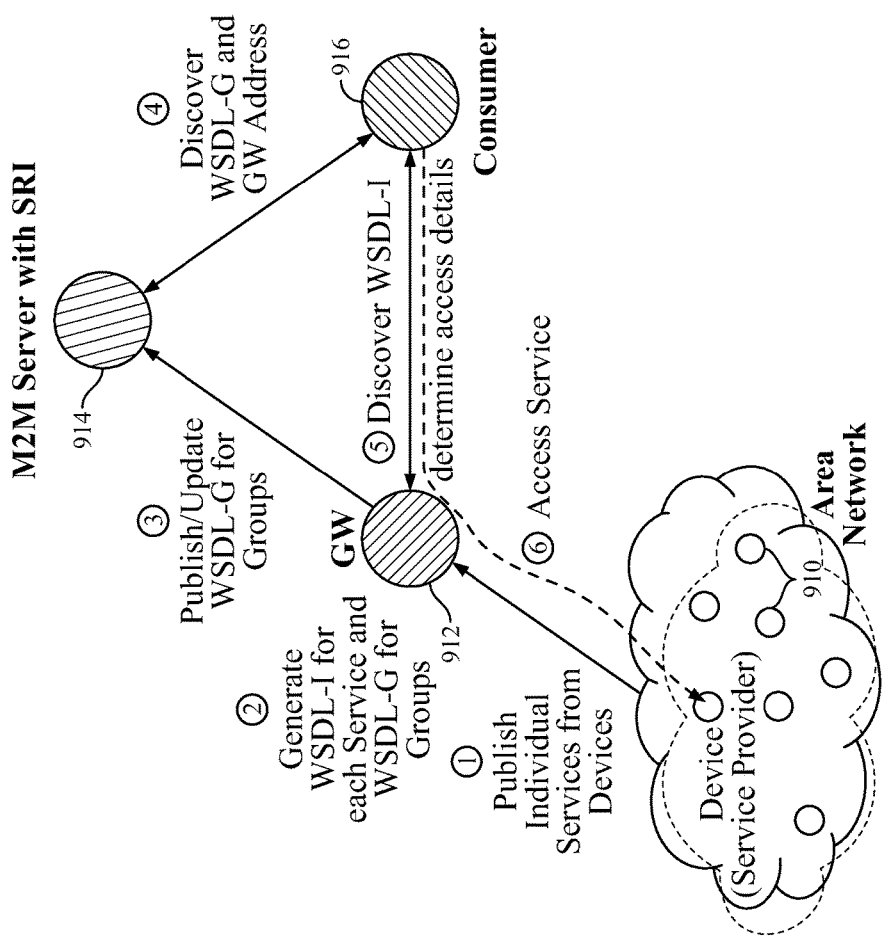
FIG. 9 is a diagram of a system architecture adapted for service publishing and discovery.

FIG. 9A is a diagram depicting system architecture and high level flows for publishing and discovery of M2M/IoT services. Referring to FIG. 9A, a plurality of M2M/IoT devices 910 are communicatively coupled with GW 912. The devices 910 may be any M2M/IoT devices such as, for example, sensors that provide sensory information. Devices 910 may communicate with GW 912 over an M2M area network, for example. Referring to FIG. 9A, at step 1, the devices 910 communicate resource descriptions to GW 912. The resource descriptions describe the resources or services provided by the particular device. The information may comprise, for example, information relating to what the service does, where the service is located, and the costs associated with the service. In an example embodiment, devices 910 and gateways 912 may be implemented using a system such as is described below in connection with FIGS. 26A-D.

At step 2, the GW 912 wraps each of individual resources into services by generating a WSDL-I file for each service. In an alternative example embodiment, the devices 910 may generate WSDL-I files and communicate the files to the GW 912. In some instances, a device 910 may be adapted to provide multiple resources such as, for example, temperature, humidity, light, etc. In an example scenario, each resource may be wrapped into a separate WSDL-I file. Typically, however, each device 910 provides only one resource. Accordingly, external consumer systems need only to discover M2M services through WSDL-I files as before, which is compliant to their existing SOA style.

M2M/IoT devices 910 may dynamically change their configurations or frequently become unavailable for energy efficiency purpose. When such changes take place at a device 910, the corresponding WSDL-I file needs to be updated accordingly. Such update occurrences may be frequent given the large number of devices that may be involved. In the disclosed system, the WSDL-I files are stored at the GW 912, instead of being directly published to SRI 914. Accordingly, the disclosed systems and methods avoid the need to transmit a large number files across a network and results in improved scalability. Rather than publish each WSDL-I file to the SRI, the GW 912 groups resources based upon similarities in functionality. In an example scenario, GW 912 may define a group of devices that record temperature readings in a particular geographic location. GW 912 creates WSDL formatted files, referred to as WSDL-G files that record the services that are members of particular groups.

Referring to FIG. 9A, at step 3, the GW 912 publishes the WSDL-G files by communicating the files to SRI 914. In an example embodiment, SRI 914 may be implemented at an M2M server consistent with a typical M2M system architecture as depicted in FIG. 7 and may be implemented on a device such as that described below in connection with FIG. 26D. GW 912 may subsequently receive update information from devices 910. For example, devices may change their configuration or go to sleep, which may result in updated resource information being communicated to the GW 912. The GW 912 in response to such updates may change the corresponding WSDL-I for the appropriate service. GW 912 may also update the corresponding WSDL-G if the change implemented by the received resource update impacts the group information reflected in the WSDL-G file. In general, WSDL-G does not need to be updated frequently because it reflects high-level common information that is not often impacted by changes to the underlying WSDL-I files. Because the WSDL-G files do not change frequently, there are relatively few instances where the GW 912 needs to forward a revised WSDL-G file to the SRI 914. As a result, the resources devoted to communicating updates between the GW 912 and the SRI 914 is reduced relative to existing methods.

There may be a plurality of WSDL-I files for any one WSDL-G file. Accordingly, the WSDL-I and WSDL-G files may be viewed as being hierarchically related. This relationship is reflected in the discovery processing which involves multiple steps. Referring to FIG. 9A, as shown at step 4, a consumer system 916, which may be any system that may make use of an M2M/IoT service, generates and transmits a request to the SRI 914. In an example embodiment, the service consumer system 916 may be a Web based application that uses information provided by a web service. In an example scenario, the consumer system 916 may be a lawn maintenance system that accesses weather report services from IoT/M2M systems and uses the received information to plan the distribution of labor in real-time. In another example scenario, the consumer system 916 may be a traffic management system that accesses traffic condition services from road-side IoT/M2M systems and uses the received information to dynamically direct traffic flows so as to alleviate congestion. In an example embodiment, service consumer system 916 may be implemented using a system such as described in connection with FIGS. 26A-D. The request may specify a query with particular parameters defining characteristics of a service. For example, the request may specify parameters defining a service that provides temperature readings between the hours of 6 PM and 6 AM at a particular warehouse facility. The SRI 914 queries the WSDL-G files stored thereon to identify particular WSDL-G files relating to groups of services responsive to the query parameters. The responsive WSDL-G files are communicated to the consumer system 916.

Referring to step 5 of FIG. 9A, the consumer system 916 parses the information in the received WSDL-G files and identifies the gateways associated with the particular files. The consumer system 916 generates and transmits a request for detailed information relating to the received WSDL-G file to the identified gateways. The GW 912 receives the request, identifies the WSDL-G file corresponding to the request, gathers the WSDL-I files corresponding to the WSDL-G file, and communicates the gathered WSDL-I files to the consumer system 916 from which the request originated.

At step 6, the consumer system 916 processes the received WSDL-I files received from GW 912. Consumer system 916 selects using the information provided in the WSDL-I files one or more service(s). Using information in the WSDL-I files for the selected services, consumer system 916 identifies the particular device 910 corresponding to the selected service(s), generates a request to access the service, and transmits the request to the particular device 910.

It will be appreciated that with respect to FIG. 9A, steps (1)-(3) relate to service publishing, steps (4)-(5) relate to service discovery, and step (6) relates to service access.

In the disclosed methods, the service access details which are included in WSDL-I files are communicated to consumer systems at a later time, i.e., when contacting the GW, as compared to existing processes which communicate WSDL files when the consumer systems contacted the SRI. Providing the service access details later in the processing as in the disclosed systems and methods allows for greater flexibility with respect to dynamic service provider binding which involves determining a specific service provider to access and obtaining the exact access details related to input/output and endpoint address information. This enhanced flexibility accommodates the dynamic changes to service status and heterogeneous characteristics that may take place within M2M devices. By comparison, in existing WSDL publishing and discovery processing, the service consumer obtains service access information directly from the SRI. Using this existing technology, it is possible that a consumer will fail to access a service on a device as the status of the device may have changed and may no longer be available. Additionally, a device with a similar service that could have provided servicing had it been selected will go unused.

While discovery of services according to the present application involves a two-step process of first querying the SRI, and subsequently querying the GW, in some circumstances discovery may proceed with a one-step request to the GW. For example, a consumer system may directly contact a GW to select appropriate WSDL-I files if the consumer system has previously obtained information regarding the GW and the groups and WSDL-I files stored thereon.

WSDL-I Template

A WSDL-I template is a generic template, which is used for generating WSDL-I files for each individual service. As mentioned earlier, since the existing WSDL 2.0 template includes only information related to how to access a service, it is less than optimal when used in M2M scenario. Applicants propose adding new attributes to the existing WSDL template so that the WSDL-I describes not only how to access a service, but also describes context or social information, such as, for example, when a service is available, where the service provider is located, and the cost to use the service. Each of these is a non-negligible factor that has the potential to affect the successful service provisioning in an M2M scenario.

With respect to the cost for using a service, the generic term "virtual price" is used herein and may refer to any suitable measure of value such as, for example, credit, score, or virtual money that can be used in M2M systems to support or facilitate social-related collaborations. For example, a device may earn credit or earn virtual money or scores for allowing other systems to access its resources.

The value of a virtual price may depend upon different application scenarios. The virtual price may be set by network operators, the devices themselves, or network carriers.

In an example embodiment, the WSDL template has been adapted to include new attributes for receiving information describing when a service is available, where the service provider is located, and the cost for use of the service. In an example embodiment, the attributes have been added into <endpoint> section of the current WSDL 2.0 template, as shown in the following example.

```
<!-- Adding new attributes to endpoint -->
    <!-- Where to access WS -->
    <service/>
        <endpoint ......>
            <!-- when the service is available -->
            <availability .../>
            <!-- where is the service provider-->
            <geoLocation .../>
            <!-- How much cost to use the service (do not have to
            be real dollars)-->
            <virtualPrice .../>
        <endpoint/>
    <service/>
<!---A example <type> and <endpoint> section of a WSDL-I file based
on above WSDL-I template >
    <xs:schema
        xmlns:xs="http://www.w3.org/2001/XMLSchema"
        targetNamespace=
        "http://greath.example.com/2004/schemas/resSvc"
        xmlns="http://greath.example.com/2004/schemas/resSvc">
    <xs:schema/>
    <types/>
        <!-- Define three new data elements, stored in <types>
        section -->
        <xs:element name="availability" type="xs:string "/>
        <xs:element name="location" type="xs:string"/>
        <xs:element name="price" type="xs:string"/>
    <types/>
    <service/>
        <endpoint address="59.169.36.79:12345">
            <availability element="availability">
                Available
            <availability/>
            <geoLocation element="location">
                780 3rd Ave., King of Prussia
            <geoLocation/>
            <virtualPrice element="price">
                0.15 unit per time
            <virtualPrice />
        <endpoint/>
    <service/>
```

For a given WSDL-I file, the <operation> element describes a message exchange pattern and data types for the inputs and outputs. The practical values for input/output are not included in the WSDL file. Rather, the input will come from the service consumer and the output will come from the service provider after processing the input. With respect to the service description information, such as the new attributes as proposed herein, the values are included in WSDL files. This is similar to the <endpoint> portion, in which a specific URI is included to indicate where the service may be accessed. Different metric systems may be used to set values for the attributes without diminishing the ability of M2M services to be widely deployed and interoperable with other services. According to one aspect of the potential embodiments, semantics information is added to the attributes to help consumers in correctly understanding the meanings of values in those attributes.

It will be appreciated that in an example embodiment, individuals may customize the attributes that are to be specified for a service. For example, individuals may employ a user interface generated and displayed by a computing system to specify what attributes apply to and are to be recorded for a service. FIG. 10A depicts an example user interface that may be generated by a system and used by individuals to specify attributes that are to be stored in a WSDL-I file for a service. As shown, the user interface provides check boxes with which a user may select which attributes the individual wishes to apply to the service and which are included in the WSDL-I file for the service. In the example embodiment of FIG. 10A, the user interface provides user interface features that allow the user to select to include in the WSDL-I file attributes specifying when a service is available, where the service provider is located, and the virtual cost of using the service. Once a user selects particular attributes that relate to the service and selects the "confirm" button, the corresponding WSDL-I file may be configured consistent with the user inputs. It will be appreciated that while the example embodiment of FIG. 10A illustrates features for selecting particular attributes, depending upon the attributes that are to be included in the corresponding WSDL-I file, the user interface may be altered and/or extended with additional features for selecting additional and/or different attributes.

Enabling WSDL-I to Describe an "Observer" Operation in CoAP

The WSDL-I file may be enabled to describe an "Observe" operation used in the CoAP protocol. In the CoAP protocol, when a client intends to subscribe to an Observe operation for a given resource, the client transmits particular information to the resource provider. For example, the client may transmit the following: the token to be used which allows the client to understand the subsequent notifications sent from the provider; and an observe time duration which indicates how long the client should receive notifications.

Describing the observe operation in WSDL-I template, involves performing particular procedures as described below. In an example scenario, the resource involved is a temperature resource on a device. Accordingly, the parameter names may relate to "temperature" for easy understanding.

In order to describe the observe operation, a new data element may be defined in the WSDL-I for observe registration (i.e., xs:element name="observeRegist"). The observe registration data element may comprise a service token to be used by the service consumer, and an observe time duration, as shown in the example below. A different token is subsequently automatically generated within the CoAP layer, which is used by the CoAP client to recognize subsequent notifications. By comparison, the observeServiceToken defined here is to enable the service consumer (which is above the CoAP layer) to recognize the notifications from the service provider. As shown in the following example, the new data elements may be defined in the <type> section of the WSDL-I file.

```
<xs:element name="observeRegist" type="tObserveRegist"/>
    <xs:complexType name="tObserveRegist">
        <xs:sequence>
            <xs:element name="observeTimeDuration"
            type="xs:string"/>
            <xs:element name="observeServiceToken"
            type="xs:string"/>
        </xs:sequence>
</xs:complexType>
```

Implementing the observe operation also involves defining a new data element (i.e., xs:element name="observeResponse") for notifications. The observeResponse notification data element comprises elements indicating, for example, the resource representation (e.g., temperature) and the token, as shown in the following example listing.

```
<xs:element name="observeResponse"
type="tCheckTemperatureResponse"/>
    <xs:complexType name="tCheckTemperatureResponse">
        <xs:sequence>
            <xs:element name="temperature" type="xs:double"/>
            <xs:element name="observeServiceToken"
            type="xs:string"/>
        </xs:sequence>
</xs:complexType>
```

Implementing the observer operation further involves defining a new value (i.e., "Observe-In-Out") for the pattern attribute in <operation> section in the WSDL-I file. Generally, WSDL 2.0 allows anyone to define new patterns, which can be processed by WSDL processors that can recognize and understand the new pattern. In fact, Observe-In-Out may become a traditional In-Out pattern if observeTimeDuration is set to 0. Accordingly, an <operation> in a WSDL-I file may be described as an "observe" operation as shown in following example. As shown below, the pattern of the operation is set to "Observe-In-Out" (indicating the consumer could receive a batch of notifications in the next period of time) and the input/output messages use the new data elements as defined above, i.e., observeRegist (used for registration) and observeResponse (used for subsequent notifications), respectively.

```
<operation name="opCheckTemperature"
pattern="http://www.w3.org/ns/wsdl/Observe-In-Out"
    style="http://www.w3.org/ns/wsdl/style/iri" wsdlx:safe =
    "true">
    <input messageLabel="In" element="observeRegist" />
    <output messageLabel="Out" element="observeResponse" />
</operation>
```

WSDL-G Template

In addition to wrapping each of the received device resources as a services by generating WSDL-I files, the GW also categorizes similar services into groups. The GW generates a WSDL-G file for each of group by summarizing the information included in WSDL-I files. The GW may alternatively or additionally generate WSDL-G files directly from information included in the resource descriptions that are received from the M2M/IoT devices. An example WSDL-G template is depicted in FIG. 11. The WSDL-G template is a generic template, which is used in generating particular WSDL-G files. As illustrated by the example WSDL-G template of FIG. 11, the WSDL-G file typically comprises high-level or aggregated statistical information related to a group of services. The WSDL-G template of FIG. 11 is presented for illustration. It will be appreciated that additional or different attributes from those depicted in FIG. 11 may be used in alternative embodiments.

Referring to FIG. 11, an example WSDL-G template may comprise a <groupIdentifier> attribute. The <groupIdentifier> attribute is intended to receive data defining the group ID. The group ID may be used by consumer services when requests are made to the GW for information about a particular group of services defined in the group.

The WSDL-G template may comprise a <groupFunction> attribute. The <groupFunction> attribute receives information describing the function of the particular group. In an example scenario, the information may comprise express semantic information.

The <numberOfMembers> attribute receives information indicating the number of members that are currently in the group. In an example embodiment, the value for the number of members may not be an exact number, but rather a more generalized metric represented in comparative terms. For example, the number of members may be represented as greater than or less than a particular value, e.g., larger than (>) 20.

The <groupStatistics> attribute receives information relating to statistics for the group of services. For example, the attribute may comprise information indicating the probability of success in accessing the services in this group. In addition, QoS-related parameters may also be added to the template. The information may be used by service consumer systems in evaluating whether or not to use services associated with the particular group.

The <locationRegion> attribute receives information indicating the region from which the services in the group are provided.

The <inputAllowed> attribute describes the parameters that are needed from consumers to perform the service. The <outputExpected> attribute describes the outputs that are expected from services in the group. The <inputAllowed> and <outputExpected> attributes do not typically provide specific descriptions for individual services, but rather, comprise a summary list of the inputs and outputs of the services in the group for clients to have an initial or high-level understanding.

The <GWAddress> attribute comprises information indicating how to contact the GW that originated the particular WSDL-G template. For example, the information may comprise an IP address and/or a specific port at which the GW may be reached.

It will be appreciated that in an example embodiment, individuals may customize the information that is specified for groupings of services. For example, individuals may employ a user interface generated and displayed by a computing system to specify the attributes that are included in the information stored for each service in the particular group. FIG. 10B depicts an example user interface that may be generated by a system and used by individuals to specify attributes for a service. As shown, the user interface provides check boxes with which a user may select the particular attributes that the individual wishes to be included in the corresponding WSDL-G file for the particular group of services. In the example embodiment of FIG. 10B, the user interface provides user interface features that allow the user to select whether or not to include in the WSDL-G file attributes specifying the quality of service provided by each of the services, and/or attributes specifying characteristics of the gateway via which the services are accessed. Once a user selects particular attributes that relate to the group of services and selects the "confirm" button, the WSDL-G file is configured consistent with the user selections. It will be appreciated that while the example embodiment of FIG. 10B illustrates features for selecting particular attributes, depending upon the attributes that are to be included in the corresponding WSDL-G file, the user interface may be altered and/or extended with additional features for selecting additional and/or different attributes.

Mapping Between Resource Description and WSDL-I Service Description

In M2M systems, device operations that are made available to other systems are referred to as resources which are described using a particular descriptive syntax and language. In Web services operations, functions provided to other systems are referred to as services which are described using a particular descriptive syntax and language. Accordingly, when a GW receives a resource description from devices, the GW needs to format the information from the resource description to be understandable to systems that expect a Web service description. This process is sometimes referred to as wrapping the resources into services by generating WSDL-I files. The processing typically involves mapping elements from a resource description into a corresponding element within a WSDL-I file.

There are numerous different approaches to describing resources. Accordingly, there is no generic procedure that can be used in all instances for processing resource descriptions to create WSDL-I files. The CoRE Resource Directory (RD) is a popular concept in the IETF domain and is often used as a repository for storing resource descriptions. RD serves as a repository for web links about resources that are hosted on devices. The RD implements a set of REST interfaces for devices to register and maintain sets of web links which are referred to as resource directory entries. The resource directory entries may serve as resource descriptions. In an example embodiment, the RD may be co-located with the GW such that M2M/IoT devices register with the RD and communicate their resource descriptions to the GW.

Figure 12:
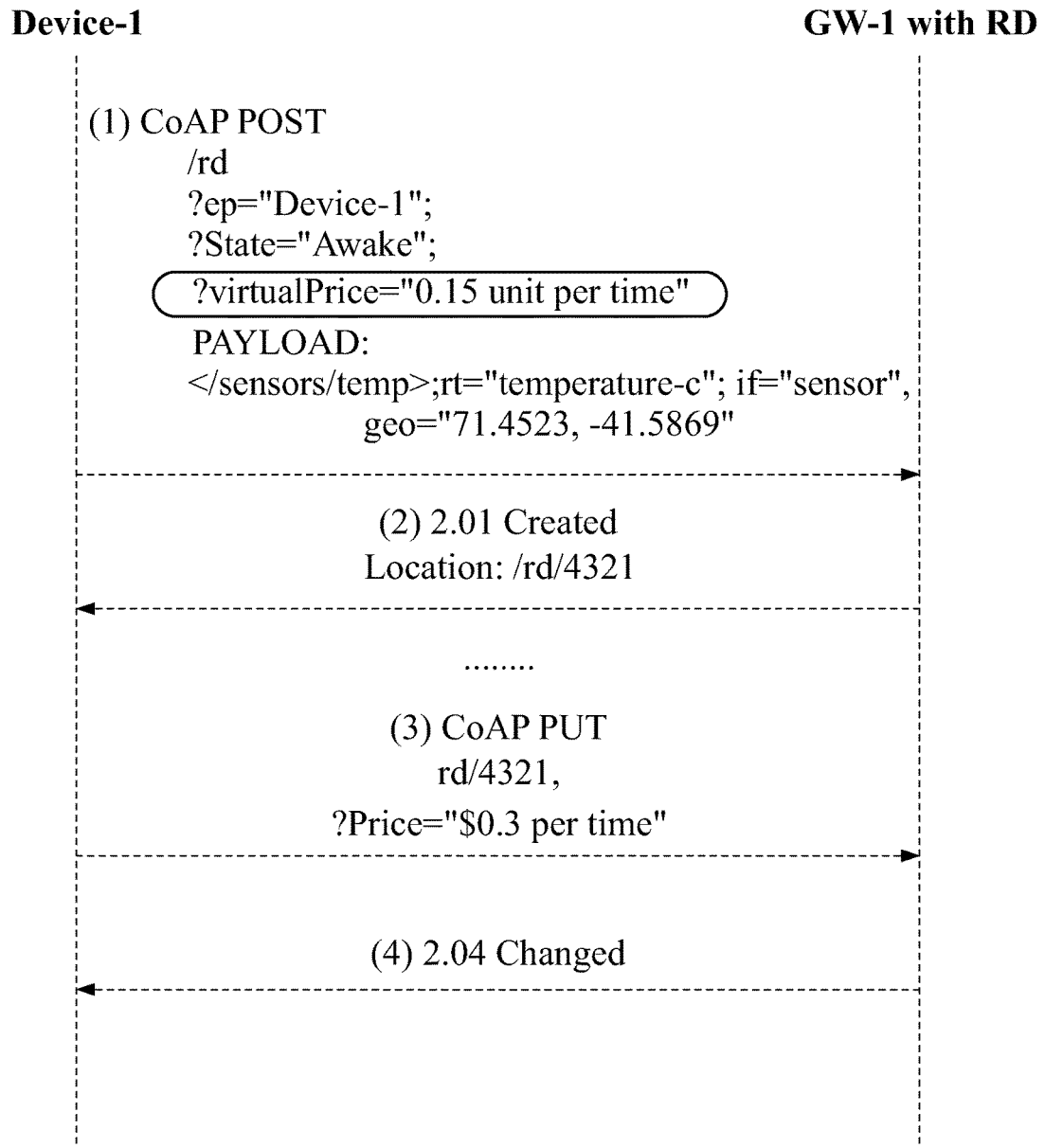
FIG. 12 is a flow diagram of a process for mapping resources into a WSDL file.

FIG. 12 depicts a process for mapping a resource description that is described using RD to a WSDL-I file. As shown in the left side of FIG. 12, Device-1 may initialize a POST request to submit its temperature resource, which is described by the link format in the payload portion of the post, to the GW. The Post request comprises all of the relevant information for describing the resource, which information is used to generate a WSDL-I file. It will be appreciated that the information provided may comprise information specifying, for example, what the resource does, where the resource is located, when the resource is available, and the cost associated with the resource. Upon receiving the request, the GW stores the resource description in RD, and executes WSDL related procedures to generate a WSDL-I file.

Generally, the GW generates a WSDL-I file from a resource description by parsing the information in the resource description and mapping the parsed information into the appropriate elements of a WSDL template. This mapping varies depending upon the formatting of the received resource description. Generally, however, the mapping requires that the GW comprise information identifying which pieces of information from the resource description correspond to which elements in the WSDL template.

Figure 13:
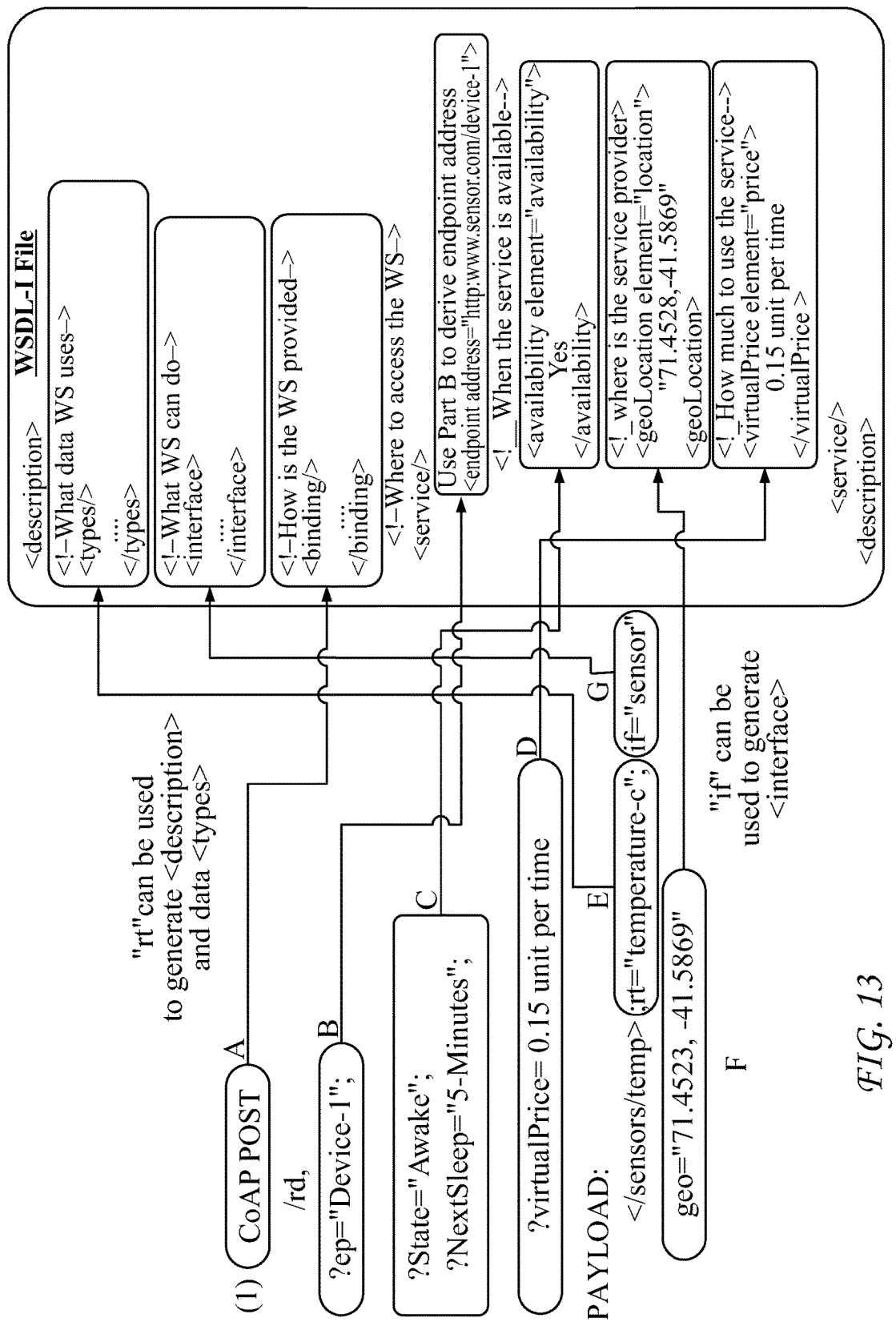
FIG. 13 is a diagram depicting a mapping between a resource description and a WSDL file.

FIG. 13 is a diagram depicting an example mapping between a received resource description and a generated WSDL-I file. Referring to FIG. 13, references character A marks information in the resource description specifying a transport protocol. As noted by the corresponding arrow, the resource description information may be used in the <binding> element in the WSDL-I file.

Reference character B marks information in the resource description specifying the particular service provider. As noted by the corresponding arrow, this particular resource description information may be used in the <service> element in the WSDL-I file.

Reference character C marks information indicating when the device/resource may not be available. As noted by the corresponding arrow, this particular information from the resource description may be used in the <availability> element in the WSDL-I file.

Reference character D marks information indicating a virtual price associated with the particular resource. As noted by the corresponding arrow, this particular information may be mapped to the <virtualPrice> element in the WSDL-I file.

Reference character F marks information indicating a location where the resource or service may be accessed. As noted by the corresponding arrow, this particular information may be mapped to the <geoLoacation> element in WSDL-I file.

Reference character E marks information specifying the type of resource or service. As noted by the corresponding arrow, the information may be mapped to the <type> element in WSDL-I file.

Reference character G marks information specifying the interface information for the particular resource. As noted by the corresponding arrow, the information may be mapped to the <Interface> element in the WSDL-I file.

Service Grouping

The GW identifies groups of services that have similar characteristics and records the identified groupings in WSDL-G files. The GW may group services based upon any useful criteria. In an example scenario, a GW may group services having similar functionalities. Typically, when a GW receives a resource description from a device, there are two typical scenarios that play out. In a first scenario the resource is of a new type, in which case the GW defines a new group for the resource and generates a WSDL-G file for the group. In a second scenario, the resource description defines an update to an existing resource description, in which case the GW updates the group and the WSDL-G file associated with the particular resource.

Figure 14:
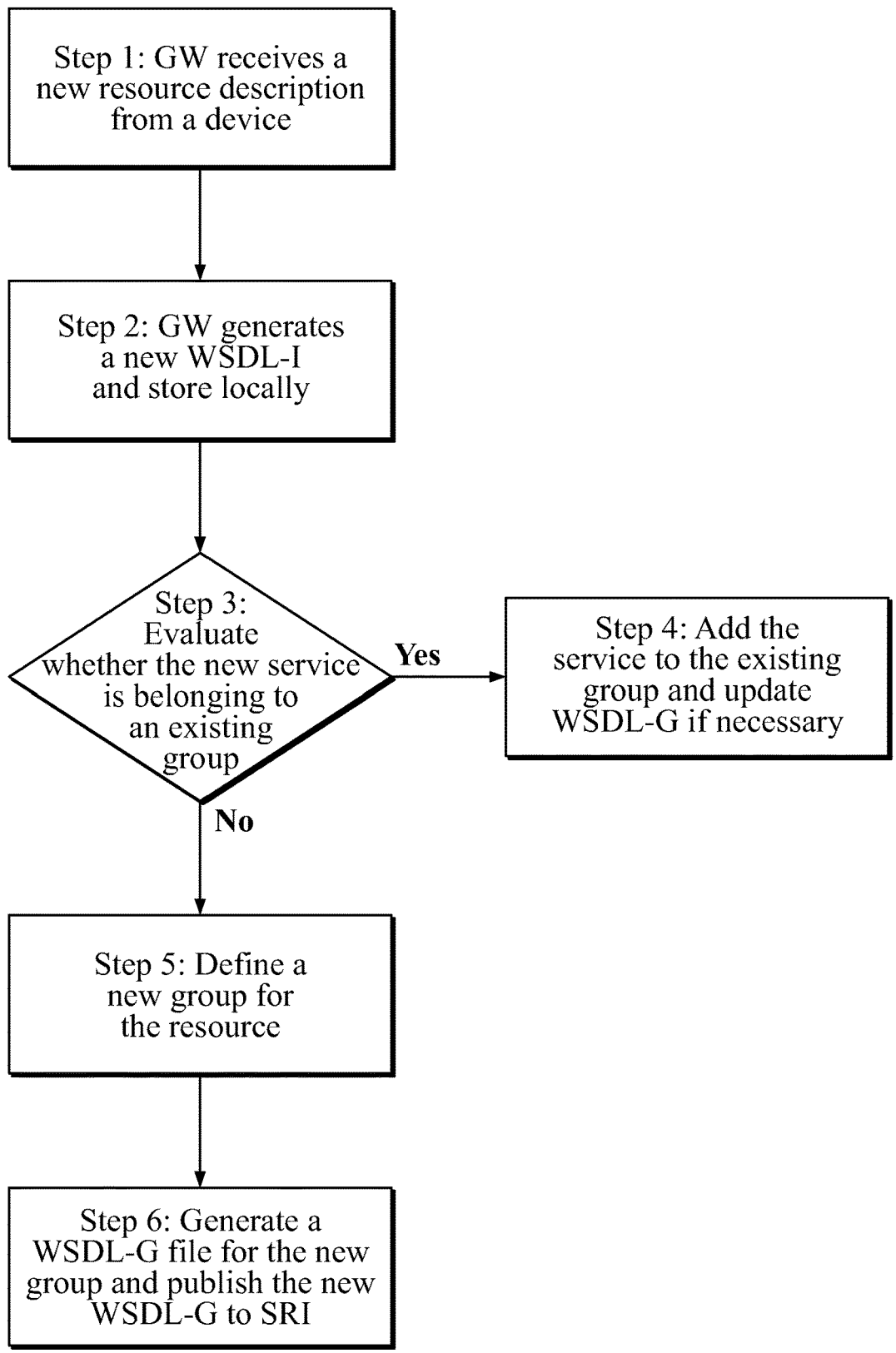
FIG. 14 is a diagram depicting processing of a received resource description.

FIG. 14 depicts a flow chart of processing performed when a resource description relating to a new resource is received at the GW. Referring to FIG. 14, at step 1, the GW receives a new resource description from a device. The resource description may be in any format suitable for communicating the relevant details relating to the resource including, for example, information specifying the functionality provided, the time that the resource is available, the location of the resource, and the cost for using the resource. In an example scenario, the resource is communicated using RD.

Referring again to FIG. 14, at step 2, the GW parses the resource information, generates a new WSDL-I file, and stores the file in memory. The GW may process the received resource description to perform the mapping as described above in connection with FIG. 13.

At step 3, the GW compares the received resource with existing groups defined by the GW. The GW evaluates whether the resource can be categorized to an existing group. If so, processing continues at step 4 where an existing WSDL-G file is updated to reflect the receipt of the particular resource. If the resource cannot be categorized in an existing group, processing continues at step 5 where a new WSDL-G file is created.

At step 4, the GW adds the newly identified resource to an existing group. More particularly, the GW updates the WSDL-G file for the existing group to reflect the new resource/service. Upon updating the WSDL-G file, the GW evaluates whether adding a new member to the group may require updating any WSDL-G files that previously were communicated to one or more SRIs. For example, if the new resource may provide more rich information than the existing members in the group, the <Output Expect> section in WSDL-G file (See FIG. 13) may need to be updated to reflect this change. If the GW determines the previously distributed WSDL-G files require updating, the GW initiates a WSDL-G update request to the SRI.

At step 5, in the instance the GW determines the new resource does not belong to any existing groups, the GW defines a new group and creates a new WSDL-G file for the group. When the group is first defined, there will only be one member of the group.

At step 6, the GW publishes the new WSDL-G file to one or more SRIs.

Figure 15:
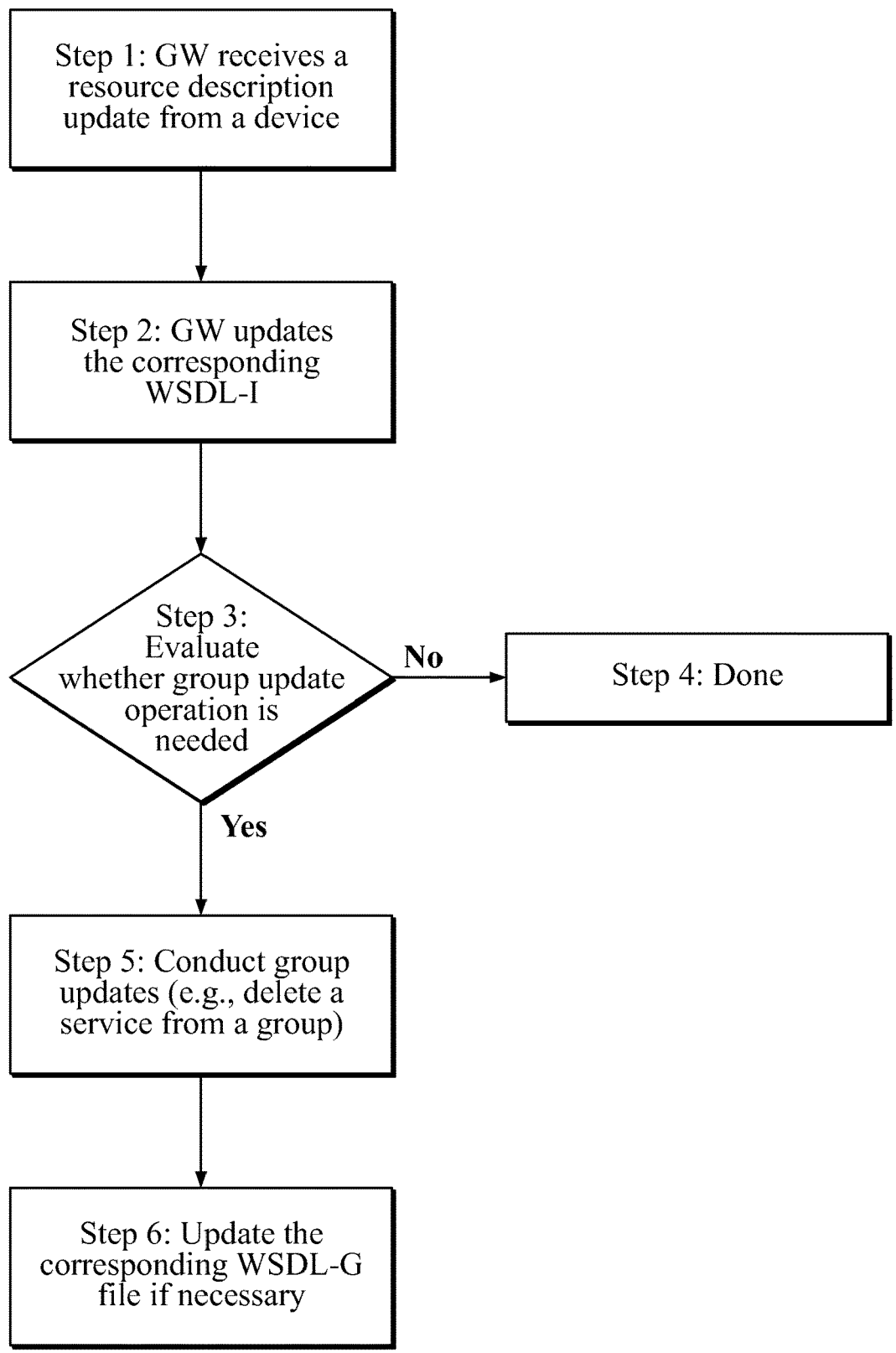
FIG. 15 is a diagram depicting processing of an update to a resource.

FIG. 15 depicts a flow chart of processing performed when a GW receives a resource description that provides an update to an existing resource. As shown, at step 1, the GW receives a resource update from a device. It is typical that M2M/IoT devices may undergo dynamic changes reflecting changes in the device's input/output, service availability, or any other aspect of the device's operations. As a result, the GW may frequently receive the resource update requests from devices as the status of devices change.

At step 2, depending on the information included in an update request, the GW updates the corresponding WSDL-I files for the particular resources that have been updated. It will be appreciated that under the improved processing disclosed herein, WSDL-I files are typically stored only at the GW and not at the SRI devices. Accordingly, frequent updates to services which are typical with M2M/IoT devices, do not require expending resources to update SRIs.

At step 3, in addition to updating the WSDL-I file, the GW also evaluates whether a resource update may affect the group that its corresponding service belongs to. If the GW determines that the resource update does not require updating the group and corresponding WSDL-G file, no further actions are needed and the processing terminates at step 4. If the GW determines that the resource update does require updating the group, processing continues at step 5.

At step 5, the GW updates the group to reflect the received service update. For example, if the received update indicates a device will become unreachable going forward due to battery energy exhaustion, the GW will delete the service from the corresponding group. The GW updates the WSDL-G file for the group.

At step 6, the GW determines whether in addition to updating the local copy of the WSDL-G file, it also needs to update any copies of the WSDL-G file stored on one or more SRIs. For example, if all the devices having a specific output interface become unavailable, the GW will modify the <outputExpect> section in WSDL-G file because that specific output is no longer supported. In this scenario, the GW may determine that the update requires a change to the group and WSDL-G of such significance that the changes should be pushed through to any SRIs currently maintaining copies of the WSDL-G. In other instances, The discussions above in connection with FIGS. 13 and 14 refer to generating WSDL-G files to record identified groups of services. The GW identifies groups of services that have similar characteristics and records the identified groupings in WSDL-G files. The GW may group services based upon any useful criteria. In an example scenario, a GW may group services having similar service functionalities. The determination of which services have similar functionalities may be performed in any suitable manner. In an example scenario where a link-format is used for describing resources and the "ct" parameter is to indicate the functionality of a resource, the GW may create a group comprising all resources/services having the same "ct."

Figure 16:
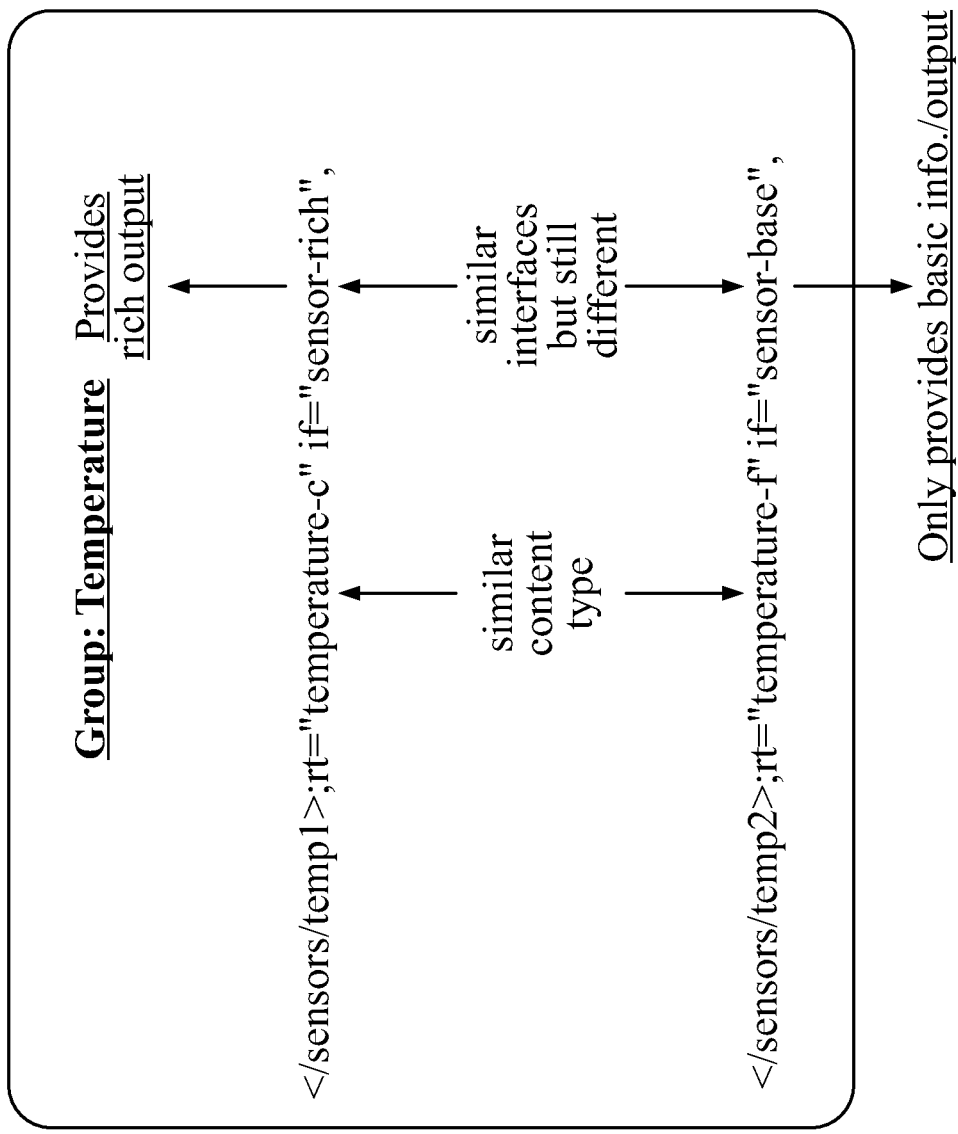
FIG. 16 is a diagram illustrating example logic employed to generate groups from individual resources/services.

FIG. 16 provides an illustration of example logic employed to generate groups from individual resources/services. In the example depicted in FIG. 16, two resource descriptions have been submitted to the GW and both relate to temperature. Accordingly, the GW may define a new group called "Temperature," and may assign the two resources to the group. In some instances, the resources may be characterized as belonging to the same group, but nevertheless may have variations between the individual resources/services. For example, from the "rt" parameter, which may correspond to result content as defined in link format specification, one of resources/services provides temperature readings in Celsius, while the other provides readings in Fahrenheit. Also, the two resources are different with respect to their "if" parameters (interface description). The "if" parameters indicate one of the two resources/services is able to provide rich information, while the other provides only basic information. This may arise in a scenario wherein one of the devices providing the resource/service supports a "sensor-rich" interface whereby it returns not only a temperature reading, but also associated context information, such as a sensing/sampling time stamp, recent trend data (getting colder or warmer), etc. In this same scenario, the other device with a "sensor-base" interface may only return a simple temperature value.

With respect to the example of FIG. 16, after defining a "Temperature" group, the GW generates a WSDL-G file for the group. An example WSDL-G file corresponding to the example of FIG. 16 is illustrated in FIG. 17. As shown in FIG. 17, the GW has assigned a specific group identifier to the group using the <groupIdentifie> parameter, which in this instance has a value of "TEM0909011." The GW has defined a value for the <groupFunction> parameter which in this instance has been assigned a value of "Temperature." The number of members in the group is identified using the <numberOfMembers> parameter which in this particular example has been assigned a value of 20. The value for the number of members may represent the number of resources (which may correspond to a number of devices) that have been associated with the group. The <groupStatistics> parameter indicates 90 percent of the attempts to access the services in the group are successful. A location for group is identified using the <locationRegion> parameter which in this particular example indicates the members of the group are distributed in the Amherst town area. The WSDL-G file includes an <inputAllowed> parameter for identifying the types of query inputs the members of the group typically accept. In this particular example, the <inputAllowed> parameter indicates the services in this group accept query/input values for zip code or geographical coordinates. In other words, the services respond to queries for temperature readings by zip code or geo-coordinates. Finally, the WSDL-G file includes a <gwAddress> parameter that identifies the address of the gateway with which the services defined in the group are associated and through which the services in the group may be contacted. In the particular example of FIG. 17, the <gwAdress> parameter identifies a particular internet protocol address at which the GW may be accessed.

Service Discovery and Access Processing

Figure 18:
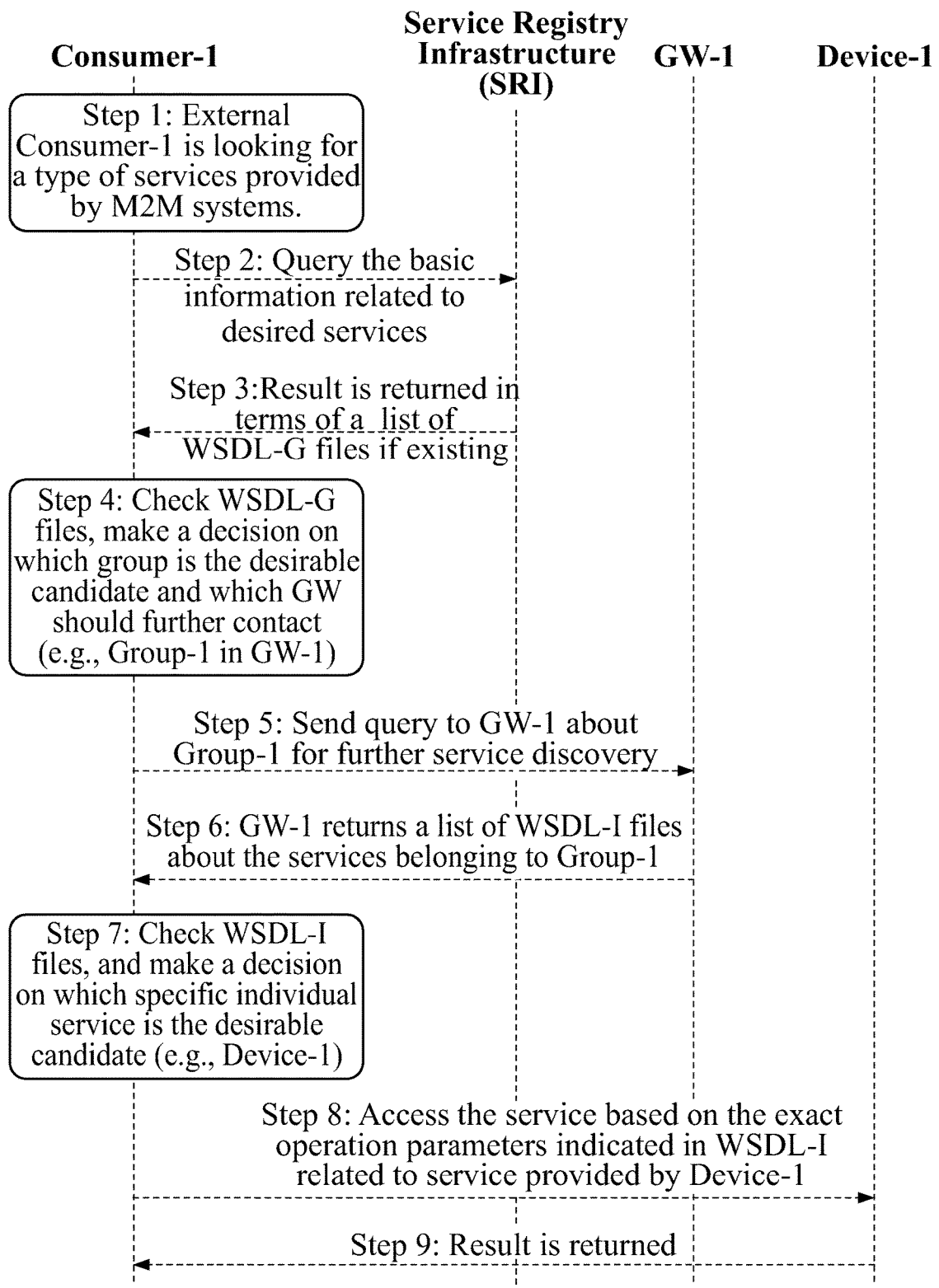
FIG. 18 is a diagram depicting example processing during service discovery.

The discussion in connection with FIGS. 13 through 16 have dealt primarily with describing example embodiments for service publishing. Once a service has been registered with the GW and the groups of services have been published to the SRIs, the services may be discovered and accessed by service consumer systems. FIG. 18 depicts a flow diagram of an example process for service discovery. Referring to FIG. 18, at step 1, a service consumer system, Consumer-1, which may be, for example, a Web service, initializes a service discovery request for services provided by M2M systems. In other words, the service consumer system determines that it requires the use of a service in order to meet an application or business demand.

At step 2, the service consumer system Consumer-1 generates and communicates a request to the SRI. The request may be formatted as a query. For example, Consumer-1 may generate and transmit a query specifying characteristics for a desired service. In an example scenario, the request may specify a desired functionality, a time during which the functionality is needed, and a preferred location from which the service is provided. It will be appreciated that any of the values discussed above in connection with FIG. 17 may be the basis for a query submitted from a service consumer system. The request/query may be formatted and communicated using any suitable technology.

At step 3, SRI uses the information in the request/query to search the group information stored thereon to identify service groups that satisfy the search criteria that were submitted by the service consumer system. More particularly, the SRI searches the data specified in the various WSDL-G files that have previously been forwarded to the SRI. Upon identifying groups of services, i.e. WSDL-G files, that satisfy the specified criteria, the SRI communicates a list of responsive WSDL-G files to the Consumer-1 system.

Under some scenarios, there may be no WSDL-G files that correspond to the selection criteria submitted by the Consumer-1. In such a scenario, the SRI may return no group information. In such an instance, the Consumer-1 system may generate a new query with a new set of selection criteria.

At step 4, the Consumer-1 system parses the contents of the identified WSDL-G files and selects one or more groups for which further information should be obtained. In other words, the Consumer-1 system determines which groups are desirable candidates for providing the desired service. The Consumer-1 system, once it has selected particular groups, identifies the gateways at which the individual files relating to the group are stored. The information identifying the gateway is retrieved from the WSDL-G files corresponding to the selected groups.

At step 5 of FIG. 18, Consumer-1 generates and transmits a query to the particular gateway, GW-1, that is identified in the WSDL-G file corresponding to the selected group of services. The query requests information regarding the particular services identified in the selected service grouping. In an example scenario, the communication requests the WSDL-I files corresponding to the services identified in the particular WSDL-G file.

At step 6, GW-1 parses the query from Consumer-1 and identifies the information requested. In an example scenario, GW-1 searches its memory to identify the WSDL-I files corresponding to a WSDL-G file that was identified in the request. In other words, GW-1 searches its memory for, and retrieves the WSDL-I files for the service comprised in an identified group. According to an aspect of the disclosed embodiments, if the number of services in an identified group is very large, GW-1 may limit the number of entries in the return list in order to speed up the search time. The GW-1 communicates the identified WSDL-I files to the Consumer-1 system.

At step 7, the Consumer-1 system parses the WSDL-I files returned from GW-1. Consumer-1 has available to it all of the information that is available for each of the services in the group. Consumer-1 selects one or more services based upon the information included in the WSDL-I files.

At step 8, Consumer-1 generates and transmits requests to the one or more services that were selected. The Consumer-1 system uses the information in the WSDL-I files for the selected services in order to determine how to format the request. For example, Consumer-1 determines from the WSDL-I file the specific manner and format for transmitting requests to the device that provides the service.

In an example scenario, Consumer 1 system transmits the WSDL-I request to the device that provides the selected service, which in FIG. 18 is identified as Device-1. In an alternative scenario, it may be necessary to communicate with Device-1 in a protocol that Consumer-1 system is not adapted to communicate in. In such scenarios, the communications with Device-1 may be routed through GW-1. The GW may perform translations or proxy functions during the service access process. In an example scenario, such translation may be required where Consumer-1 system is adapted to communicate using HTTP, but the Device-1 is adapted to use the CoAP protocol.

Finally, at step 9, the Device-1 performs the service requested by Consumer-1.

Availability-Aware Service Discovery and Access

As discussed above, according to an aspect of the disclosed embodiments, the WSDL template may be modified to support recording additional information regarding services including service availability, service location, and service price. As a consequence of having captured this information, the information may be used during the service discovery processing and service access.

Figure 19:
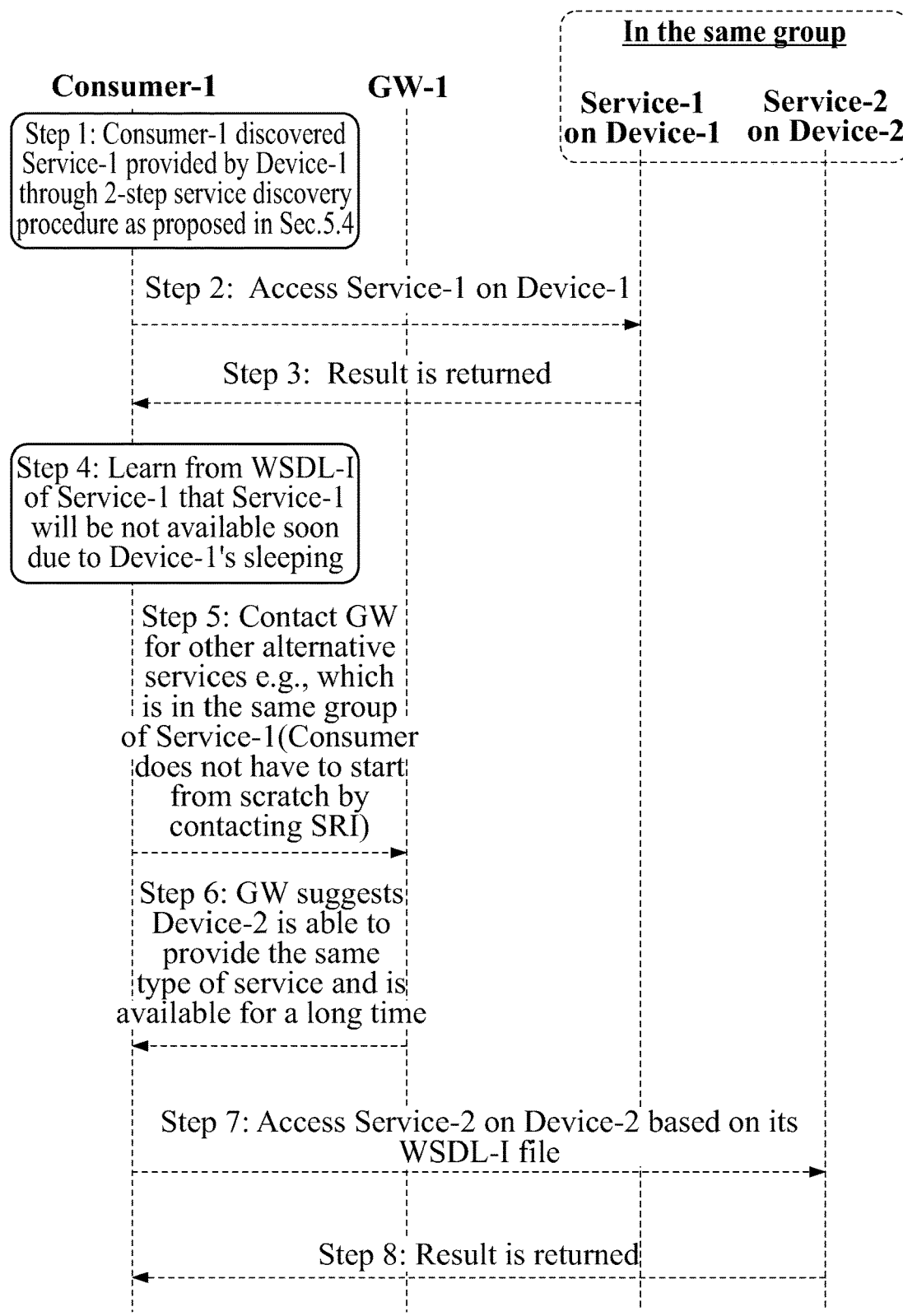
FIG. 19 is a diagram depicting example processing during service discovery.

FIG. 19 illustrates example processing during service discovery where information relating to service availability has been recorded for each service. Referring to FIG. 19, Consumer-1 follows the process as outlined above in connection with FIG. 18 to discovery and access Service-1 on Device-1. As part of that process, Consumer-1 receives service/device availability information regarding service-1. In an example scenario, the service/device availability information may indicate that service-1 is scheduled to become unavailable at a particular date and time. In such a scenario, and as shown at step 4 of FIG. 198, Consumer-1 service identifies that service-1 is going to become unavailable, and at step 5 proactively contacts GW-1 to search for an alternative device that can provide the same type of service as provided by service-1. It will be appreciated that in most instances, Consumer-1 service does not need to discover the new service by contacting SRI because GW-1 is able to directly return alternative WSDL-I files of other available services which are in the same group as service-1. At step 6, GW-1 searches memory for other services that provide a similar service to service-1 and which are available during the required times. GW-1 communicates to Consumer-1 that service-2 on device-2 is a candidate to replace service-1. The communication includes the WSDL-I file for service 2. At step 7, Consumer-1 system uses the information in the WSDL-I file for service-2 to generate and transmit a request to service-2.

It will be appreciated that there are other methods to make use of the availability information. For example, an alternative way to support availability-aware service discovery and access is for the consumer system to specify its requirement to the GW, and the GW to return a batch of services so that the consumer system may access the services in order when one becomes unavailable.

Location-aware Service Discovery and Access

Figure 20:
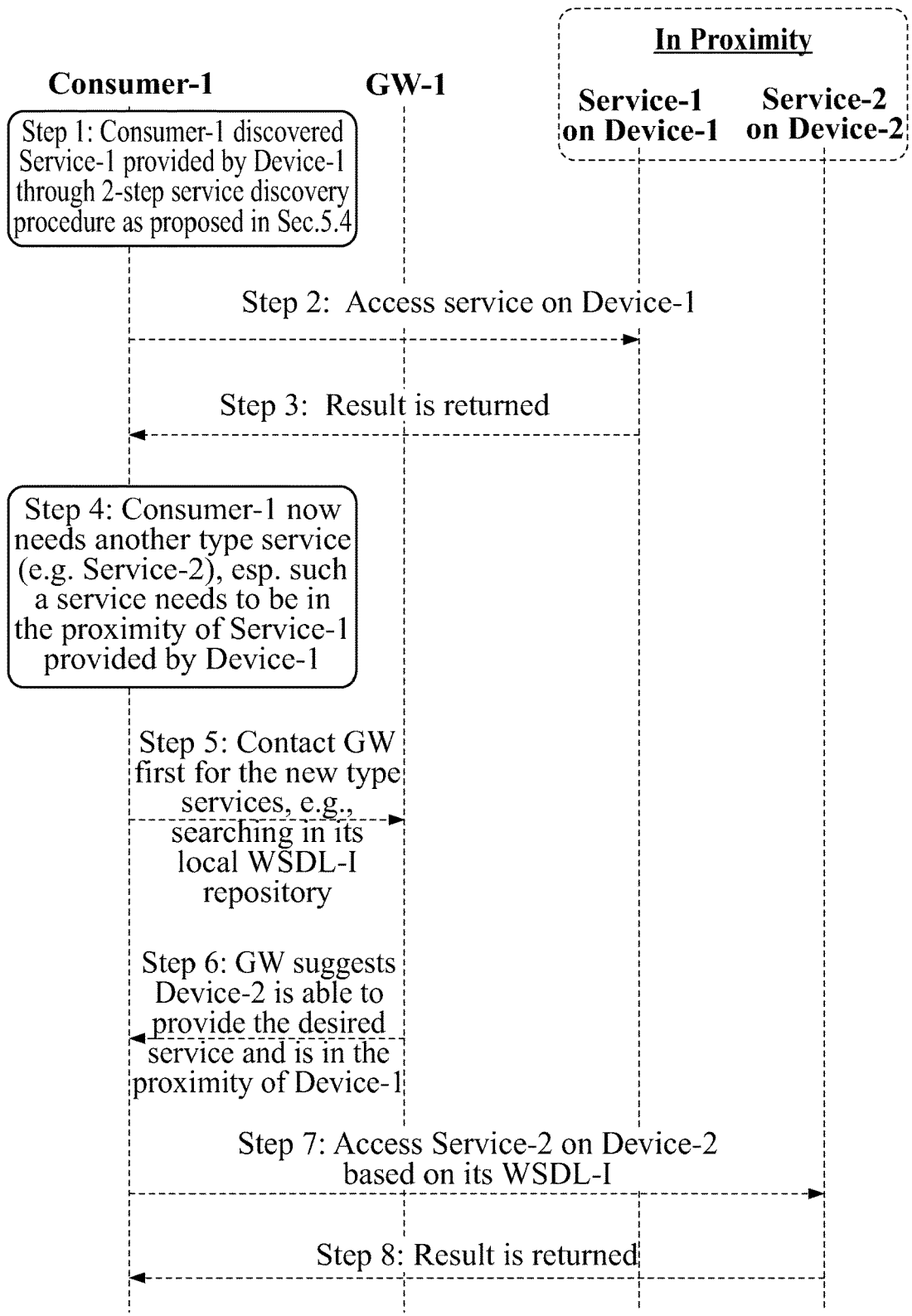
FIG. 20 is a diagram depicting example processing during service discovery.

FIG. 20 illustrates example processing during service discovery where information relating to a service's geographic location has been recorded for each service and stored in the corresponding WSDL-I file. Referring to FIG. 20, Consumer-1 follows the process as outlined above in connection with FIG. 18 to discover and access service-1 on device-1. As part of that process, Consumer-1 system receives service/device geographic location information regarding service-1. Based on an application or business requirement, at step 4, Consumer-1 subsequently may require one or more additional services in proximity to service-1. In an example scenario wherein service-1 relates to reporting a temperature and Consumer-1 is a fire alarm application in an enterprise system of a company, Consumer-1 may determine that it needs additional readings as to light or smog in the proximity of service-1. At step 5, Consumer-1 system generates and transmits a request to GW-1 for a service with particular characteristics. Because the request is for services in proximity to service-1, it is likely that GW-1 will also have stored thereon WSDL-I files relating to the requested services. At step 6, GW-1 searches for services satisfying the requested criteria and identifies service 2 on device 2. GW-1 transmits a response to Consumer-1 system identifying service 2 and including a WSDL-I file for service 2. At step 7, Consumer-1 system transmits a request to access service-2.

Virtual Price-aware Service Discovery and Access

Figure 21:
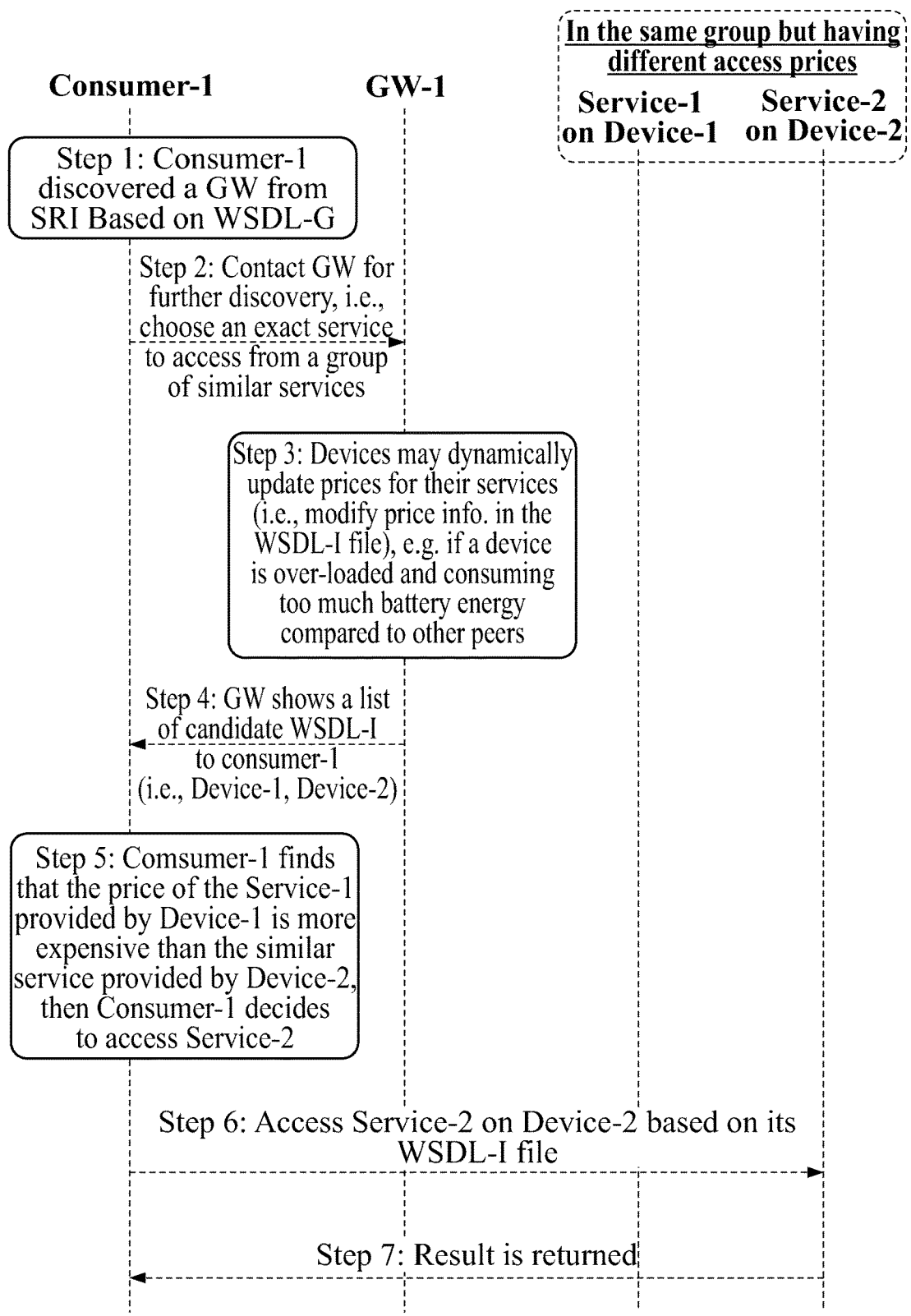
FIG. 21 is a diagram depicting example processing during service discovery.

FIG. 21 illustrates example processing during service discovery where information relating to virtual price has been recorded for each service. Referring to FIG. 21, at step 1, Consumer-1 system uses a WSDL-G file retrieved from a SRI to identify GW-1 as having information regarding services corresponding to WSDL-G. At step 2, Consumer-1 communicates a request to GW-1 for further service discovery. As shown at step 3, with the virtual price information included in WSDL-I, the devices themselves or the network operators can dynamically update the prices for different purposes. For example, if a device has been over-loaded for a long time and has been consuming too much energy compared to other peers, the virtual price of the service provided by that device could be set to a higher value such that some of service access requests can be off-loaded to other peers in the same group. The ability to include price information in the WSDL-I file enables the service provider to have a more flexible service scheme depending on any number variables such as, for example, requesters' locations, the identity of the requesting organization, or memberships of the requesting organization, any of which may cause a different price to be charged.

Referring again to FIG. 21, at step 4 the GW generates and transmits a list of candidates including WSDL-I files to Consumer-1. The information in the WSDL-I files contain the virtual price information associated with each service. At step 5, Consumer-1 evaluates each of the WSDL-I files in order to select a service. As part of the evaluation, Consumer-1 considers the relative price of using each of the services. In an example scenario, the Consumer-1 system determines to use service-2 at least in part due to the relative price of the services. At step 6, Consumer-1 transmits a request to service 2. At step 7, service-2 returns the results from the service.

oneM2M Embodiment

It will be appreciated that there are many different possible implementations of the systems and methods disclosed herein. In an example embodiment, the disclosed methods for resource publication and discovery may be implemented using a RESTful resource-based programming interface according to the oneM2M specification.

Generally, and as noted above in connection with FIG. 3, the oneM2M common services layer supports a set of Common Service Functions (CSFs). An instantiation of a set of one or more particular types of CSFs is referred to as a Common Services Entity (CSE) which can be hosted on any of several different types of network nodes (e.g. Infrastructure Node, Middle Node, etc., and their corresponding CSEs are termed by IN-CSE, MN-CSE respectively). A oneM2M application is often termed as an Application Entity (AE).

Figure 22:
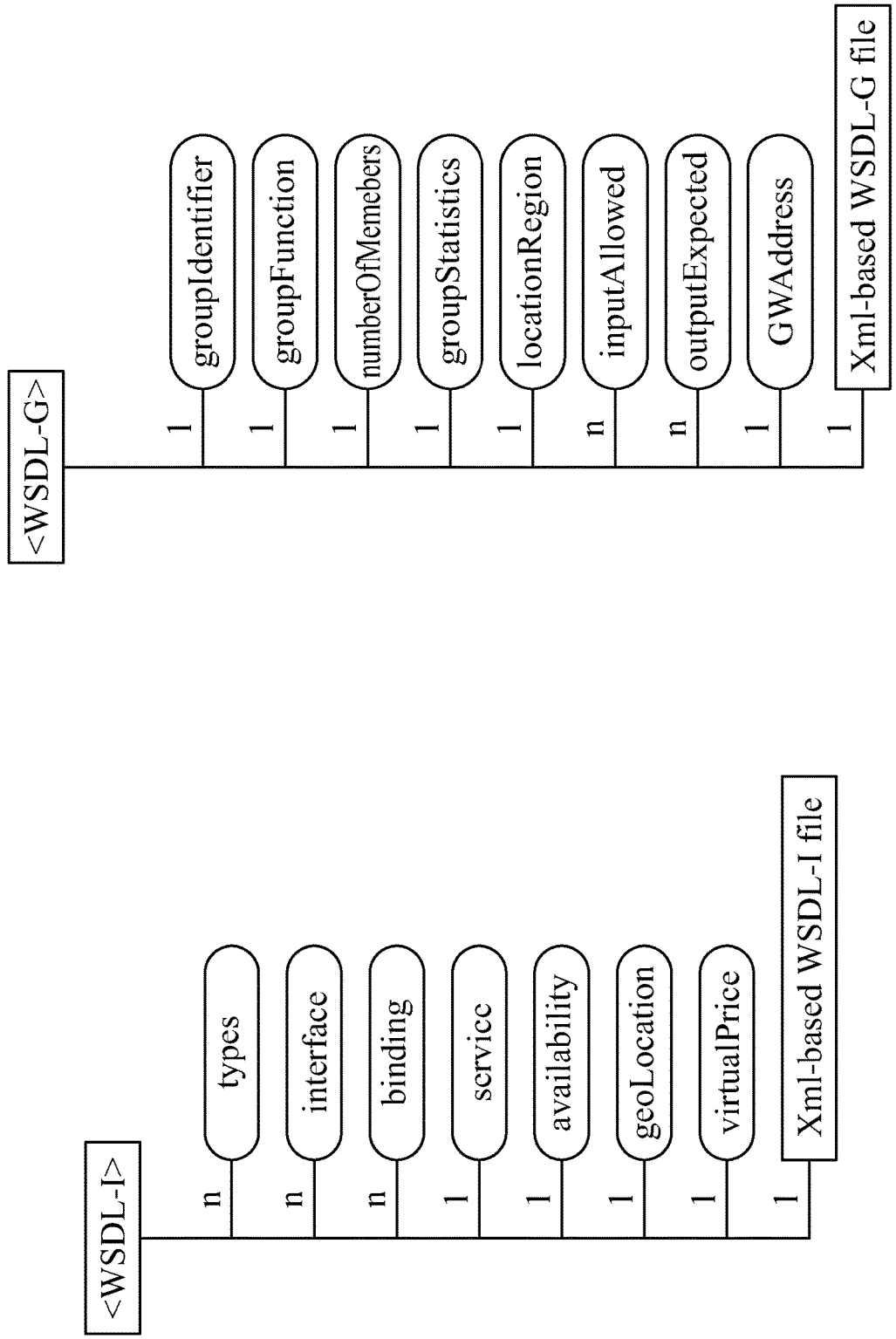
FIG. 22 is a diagram depicting an M2M resource configuration for implementing service publication and discovery.

In an example M2M embodiment of a system for service publishing and discovery, two new resources, <WSDL-I> and <WSDL-G>, are defined. FIG. 22 illustrates an example implementation of the two resources. The figure uses the following oneM2M conventions for describing resources: square boxes are used to represent resources and child resources; square boxes with round corners are used to represent attributes; multiplicity of each attribute and child resource is defined; and resource names delimited with "<" and ">" indicate names assigned during the creation of the resource.

Referring to FIG. 22, each of each of resources <WSDL-I> and <WSDL-G> have a batch of attributes and child resources. For example, the attributes in <WSDL-I> resources correspond to the different data elements as defined in a WSDL-I file, such as types, interfaces, binding, etc., as described earlier. Similarly, the attributes in <WSDL-G> resource corresponds to the different data elements as described above in connection with FIG. 11.

It will be appreciated that the M2M resources <WSDL-I> and <WSDL-G> are used within M2M systems. The M2M GW generates the xml-based WSDL-I and WSDL-G files, which are discovered and accessed by the external service consumers. As shown, the xml-based WSDL-I and WSDL-G files may be stored in a <container> type of resource as indicated in the Figure by the notations <XML-based WSDL-I file> and <XML-based WSDL-I file>.

The M2M GW operates as an edge function/component. The M2M GW not only leverages current oneM2M architecture for communicating between different nodes within M2M systems but also enables external service consumer systems using conventional WS-based protocols to access the M2M services.

Figure 23:
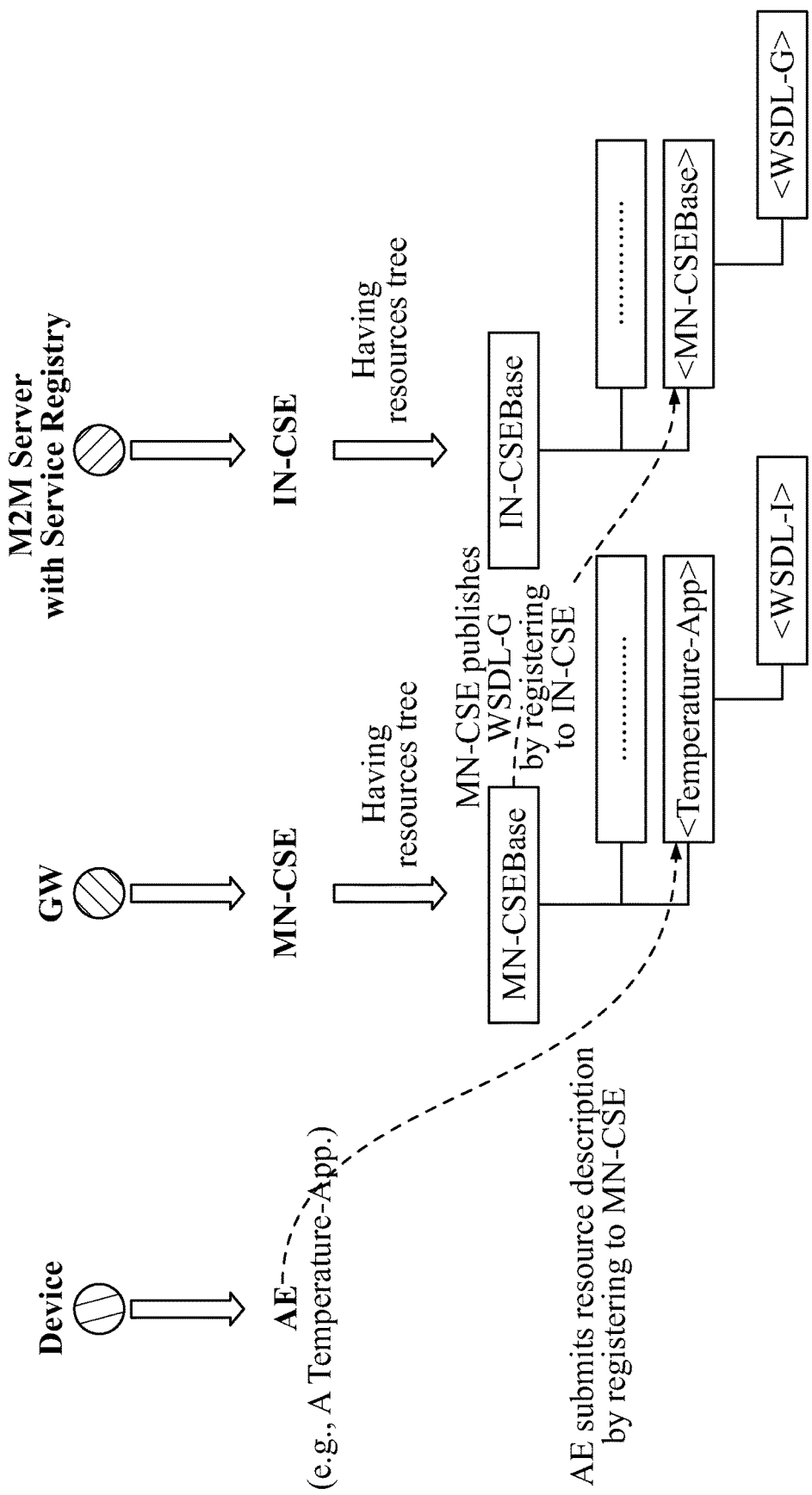
FIG. 23 is a diagram depicting service publication from an M2M service layer perspective.

FIG. 23 illustrates service publication from an M2M service layer perspective. Referring to FIG. 23, several oneM2M service layer entities sit on the M2M device, M2M GW, and M2M server respectively. More particularly, an AE operates on an M2M device, an MN-CSE operates on an M2M GW, and an IN-CSE operates on an M2M server. Accordingly, an AE, which may be, for example, a temperature reading application, is able to submit its resource description by registering to the MN-CSE. The MN-CSE generates a <temperature-App> resource and a child <WSDL-I> resource. The MN-CSE publishes WSDL-G to the SRI by registering to IN-CSE where a <WSDL-G> resource is created as the child resource of <IN-CSEBase>/<MN-CSEBase>.

Figure 24:
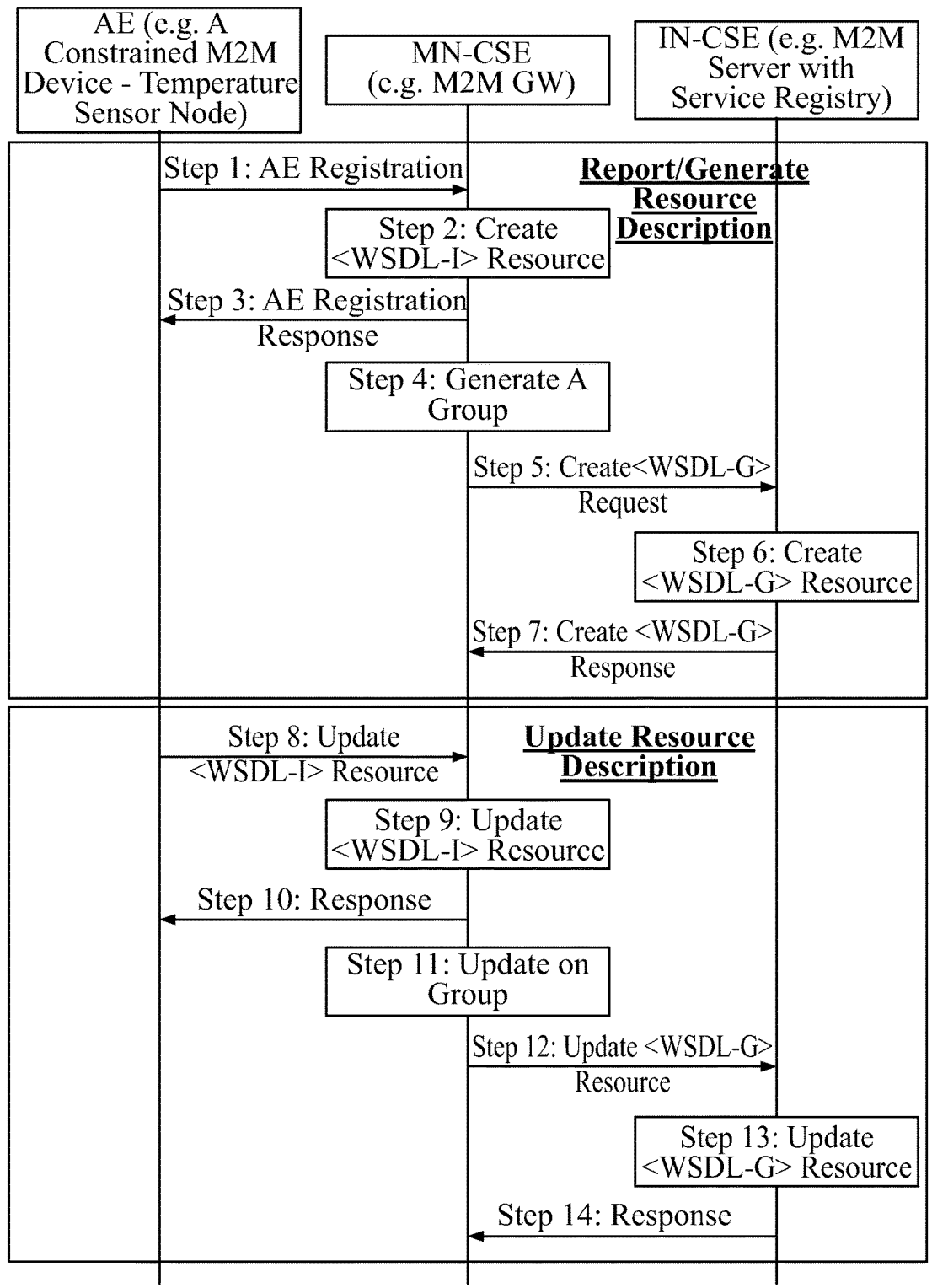
FIG. 24 is a diagram depicting a call flow for service publication and discovery between M2M system components.

FIG. 24 illustrates the detailed call flow associated with the above process. Referring to FIG. 24, steps 1-7 relate to report/generate resource description, while steps 8-15 relate to updating resource description.

At step 1 of FIG. 24, an AE executes on a constrained M2M device. In an example scenario, the AE reads and reports temperature information measured by the device.

After discovering MN-CSE running on an M2M GW node, the AE registers itself to the MN-CSE. The registration message includes a description of the resources that the M2M device provides. The resource description comprises attributes such as those described above in connection with the discussion of the WSDL-I file.

At step 2, the MN-CSE generates an <application> resource corresponding to the AE. Using the resource descriptions provided in the registration message, the MN-CSE generates a <WSDL-I> resource which can be placed under the <application> resource.

At step 3, after successfully completing the registration and generating resources, the MN-CSE generates and transmits confirmation to the AE.

At step 4, the MN-CSE identifies whether the AE and its resource may be assigned to an existing group of services. If the MN-CSE determines the resource cannot be assigned to a new group, it generates a new group.

At step 5, the MN-CSE generates and transmits a resource creation request to IN-CSE operating on an M2M Server. The creation request comprises all attributes related to the WSDL-G as discussed previously.

At step 6, after receiving the request from MN-CSE, the IN-CSE generates a <WSDL-G> resource based on the group description information forwarded in the request of step 5.

At step 7, after creating the <WSDL-G> resource, IN-CSE generates and a response to MN-CSE confirming the action.

At this point in the processing, the publication of the new resource is complete. The resource/service is available to be discovered by consumer systems and individual resources are available to be requested as described above.

M2M devices are subject to changes in status. For example, M2M devices may go through periods where they sleep so as to conserve resources. Accordingly, the operating status of M2M devices frequently changes. Referring to FIG. 24, at step 8, when an AE on an M2M devices change status or has an upcoming change in status, the AE generates and communicates an update request to the MN-CSE. The request comprises information about the change in status and signals that a change should be made to update one or more attributes of the <WSDL-I> resource.

At step 9, the MN-CSE updates the <WSDL-I> resource to reflect the change in status. The types of updates may be varied. For example, an update might relate to an attribute in the resource such as, for example, a request to modify the "availability" attribute in the resource to reflect node sleeping. In another example scenario, the update may require deleting the <WSDL-I> resource due to faulty hardware.

At step 10, after updating the <WSDL-I> resource, the MN-CSE generates and transmits a confirmation to the AE.

At step 11, the MN-CSE determines that an update to the group to which the <WSDL-I> belongs is needed so as to reflect the update to the <WSDL-I> resource.

At step 12, the MN-CSE generates and transmits a resource update request to IN-CSE. The request specifies to update the corresponding <WSDL-G> resource on the IN-CSE.

At step 13, after receiving the request from the MN-CSE, the IN-CSE update the <WSDL-G> resource based on the group update description included in the request.

At step 14, after updating the <WSDL-G> resource, the IN-CSE generates and transmits a confirmation of the update to the MN-CSE.

Alternative Service Publishing and Discovery

Figure 25:
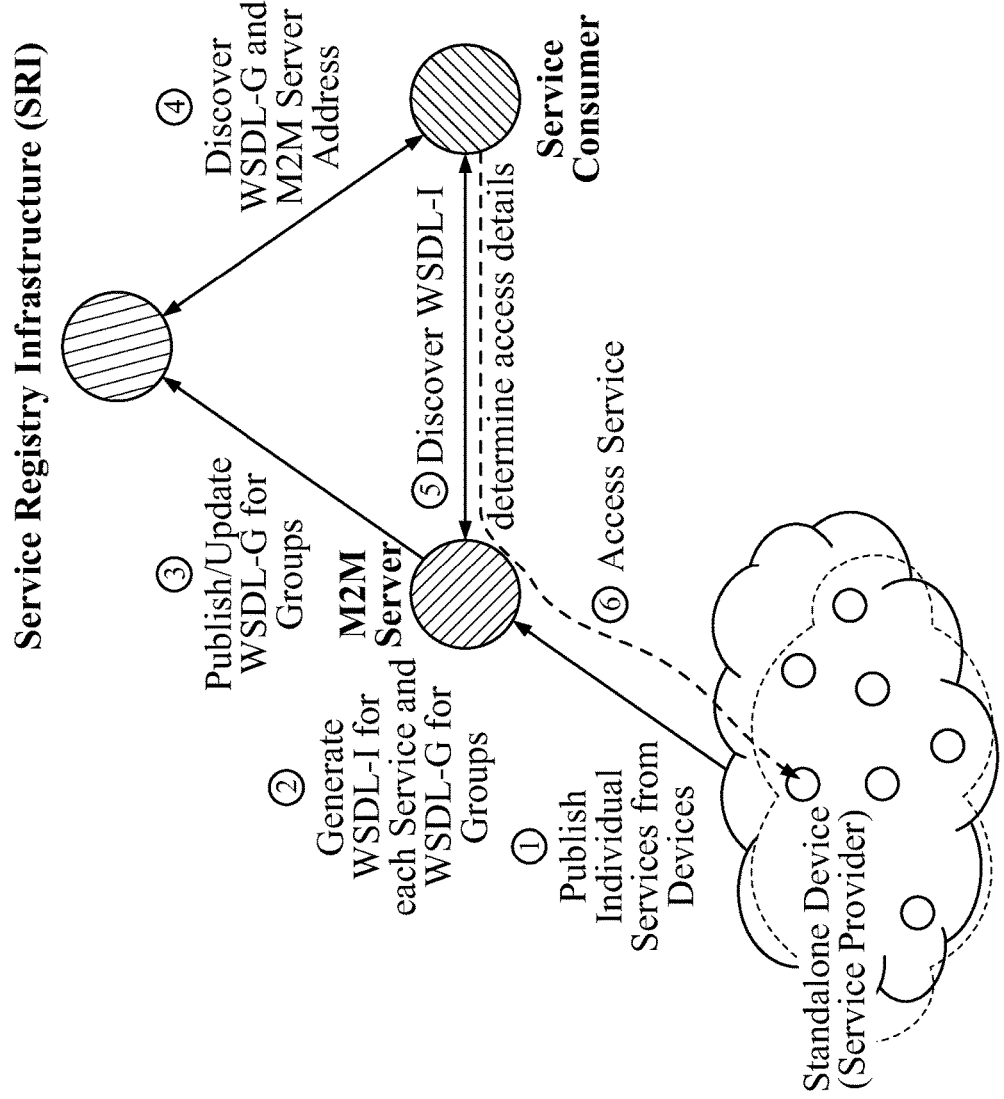
FIG. 25 is a diagram of an alternative architecture for service publishing and discovery.

It will be appreciated that there are additional embodiments for service publishing and discovery consistent with the systems and methods disclosed herein. In the embodiments described above in connection with FIGS. 9 and 22, the GW plays an important role in helping resource-constrained devices. In an alternative embodiment such as is depicted in FIG. 25, standalone devices (e.g., cellphone) may talk directly to the M2M Server without traversing the GW. Accordingly, the processing that is described above as being performed by the GW, in an alternative embodiment could be extended to the M2M Server. Additionally, the SRI could be implemented as a separate entity as shown in FIG. 25, rather than as being implemented on the M2M server.

Example Computing Environment

Figure 26A:
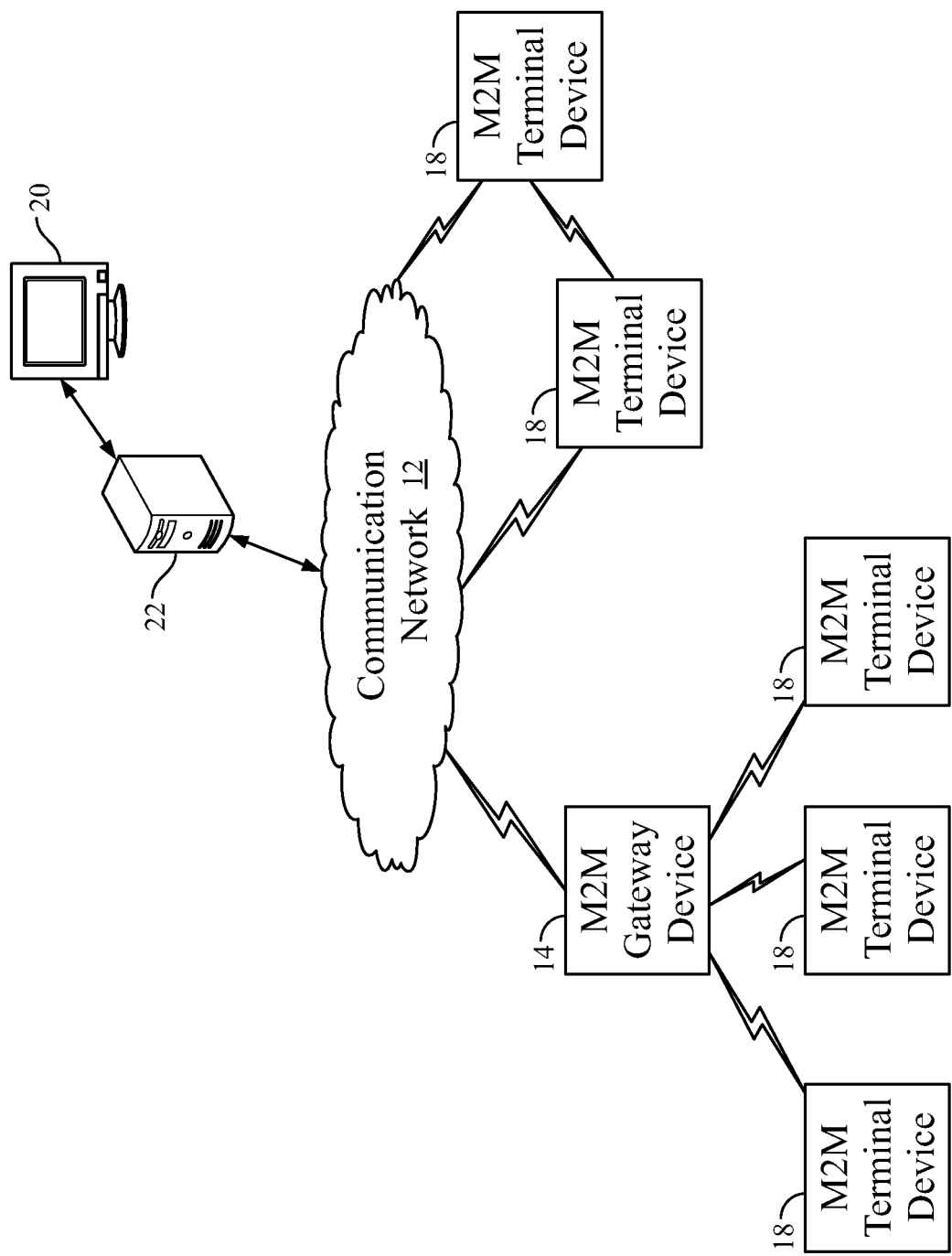
FIG. 26A is a diagram of an example machine-to machine (M2M), Internet of Things (IoT), or Web of Things (WoT) communication system.

FIG. 26A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as, for example, AE 310, CSE 312, NSE 340, GW 226, GW 912, SCS 916, and UE 916 as well as logical entities that produce the user interfaces.

As shown in FIG. 26A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 26A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 26B:
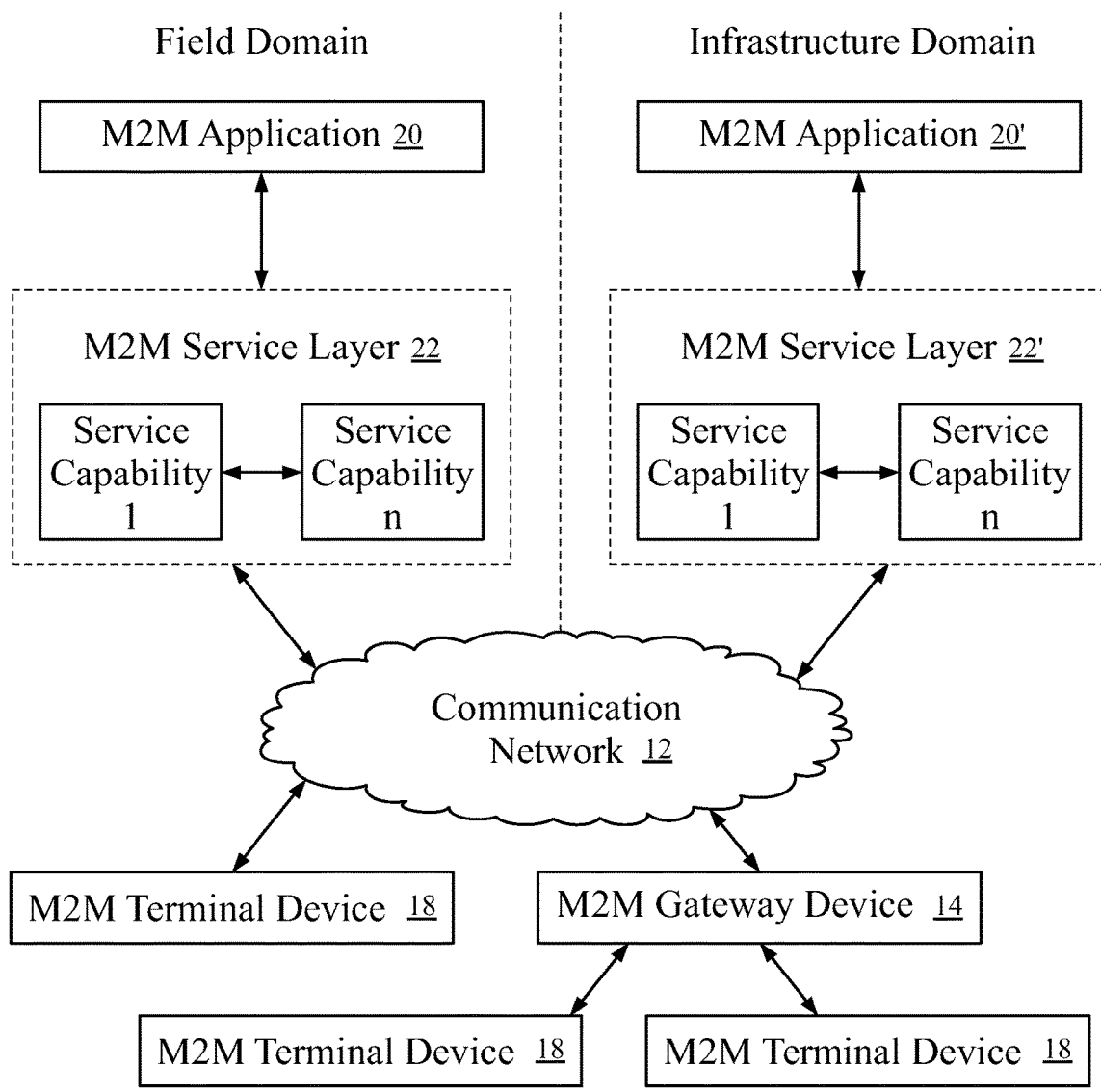
FIG. 26B is a diagram of an example system depicting operation of the M2M service layer in providing services for the M2M application, M2M gateway devices, M2M terminal devices, and the communication network.

Referring to FIG. 26B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as, for example, AE 310, CSE 312, NSE 340, GW 226, GW 912, SCS 916, and UE 916. The M2M service layer 22 may be implemented by one or more servers, computers, devices, virtual machines (e.g. cloud/storage farms, etc.) or the like, including for example the devices illustrated in FIGS. 20C and 20D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 26B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as, for example, AE 310, CSE 312, NSE 340, GW 226, GW 912, SCS 916, and UE 916 may be hosted within a M2M service layer instance hosted by an M2M node, such as an M2M server, M2M gateway, or M2M device, as shown in FIG. 20B. For example, the logical entities such as AE 310, CSE 312, NSE 340, GW 226, GW 912, SCS 916, and UE 916 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 26C or FIG. 26D described below.

Further, logical entities of the present application such as AE 310, CSE 312, NSE 340, GW 226, GW 912, SCS 916, and UE 916 can be implemented as part of an M2M network that uses a Service Oriented Architecture (SOA) and/or a Resource-Oriented Architecture (ROA) to access services of the present application.

Figure 26C:
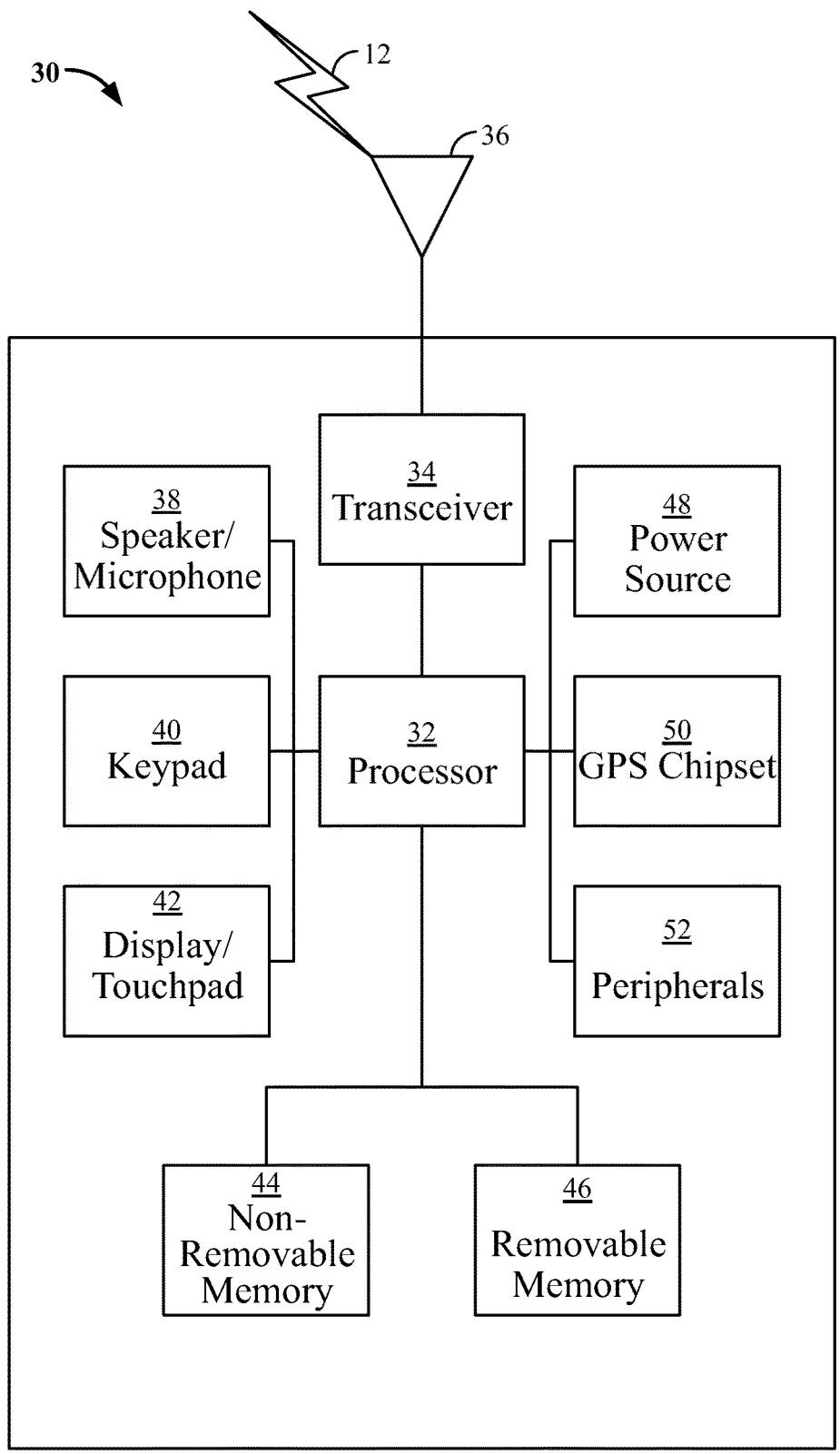
FIG. 26C is a diagram of a system suitable for use as a base station in connection with the systems and methods described herein.
Figure 26D:
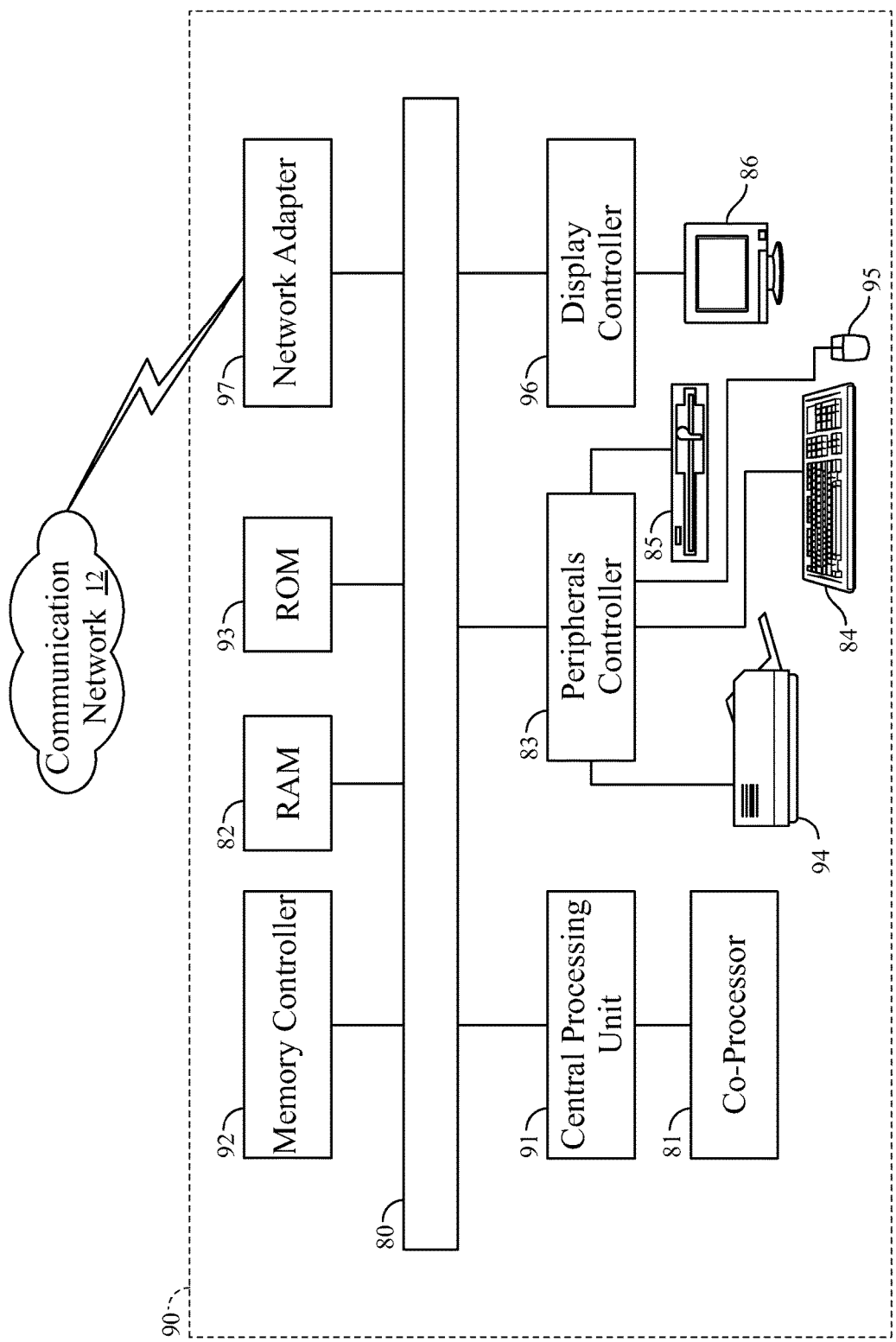
FIG. 26D is a diagram of an exemplary computing system that may be used to implement the systems and methods described herein.

FIG. 26C is a block diagram of an example hardware/software architecture of a M2M network node 30, such as, for example, an eNB 2100, an M2M device 18, an M2M gateway 14, an M2M server, or the like. The node 30 can execute or include logical entities such as AE 310, CSE 312, NSE 340, GW 226, GW 912, SCS 916, and UE 916. The device 30 can be part of an M2M network as shown in FIG. 26A-B or part of a non-M2M network. As shown in FIG. 26D, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any subcombination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 26C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 26C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 20D as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 26D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as AE 310, CSE 312, NSE 340, GW 226, GW 912, SCS 916, and UE 916. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 26A and FIG. 26B, to enable the computing system 90 to communicate with other nodes of the network.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as AE 310, CSE 312, NSE 340, GW 226, GW 912, SCS 916, and UE 916 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

Accordingly, Applicants have disclosed example systems and methods for publication and discovery of M2M/IoT services. In the example systems and methods, a gateway system receives resource descriptions from M2M/IoT devices. The gateway system creates for each received resource description an individual web services description language file (WSDL-I file) recording information about the resource. The gateway identifies groups of services with similar characteristics and generates for each identified group a web service description file (WSDL-G file) recording information regarding the group. The WSDL-G files are communicated to a service registry infrastructure (SRI). A consumer system queries the SRI for services satisfying particular criteria and receives WSDL-G files for groups of services that satisfy the criteria. The consumer system requests the WSDL-I files corresponding to a selected WSDL-G file from the gateway. The consumer system selects a particular service using the received WSDL-I files and uses the information in the WSDL-I file for the selected service to request the service from the corresponding M2M/IoT device.

It will be appreciated that while illustrative embodiments have been disclosed, the scope of potential embodiments is not limited to those explicitly set out. For example, while the system has been described with primary reference to M2M gateways and SRI, other computing arrangements may additionally or alternatively be used. The envisioned embodiments extend beyond implementations using a particular architecture or technology. For example, the potential embodiments may employ computer readable descriptive languages other than WSDL. The potential implementations extend to all types of service layer architectures, systems, and embodiments.

It should be understood that the various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computer systems or devices, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

The following is a list of acronyms relating to service level technologies that may appear in the above description.

| | |
|---|---|
| AE | Application Entity |
| CoAP | Constrained Application Protocol |
| CoRE | Constrained RESTful Environment |
| CSE | Common Services Entity |
| CSF | Common Service Functions |
| GW | Gateway |
| HTTP | HyperText Transfer Protocol |
| IETF | Internet Engineering Task Force |
| IoT | Internet of Things |
| JSON | JavaScript Object Notation |
| M2M | Machine-to-Machine |
| MEP | Message Exchange Pattern |
| OWL-S | Web Ontology Language for Web Service |
| RD | Resource Directory |
| REST | Representational State Transfer |
| ROA | Resource Oriented Architecture |
| RPC | Remote Procedure Call |
| RSDL | RESTful Service Description Language |
| SOA | Service Oriented Architecture |
| SOAP | Simple Object Access Protocol |
| SRI | Service Registry Infrastructure |
| UDDI | Universal Description Discovery and Integration |
| WADL | Web Application Description Language |
| WS | Web Service |
| WSDL | Web Service Description Language |
| WSDL-G | WSDL file for a Group of Similar Services |
| WSDL-I | WSDL file for an Individual Service |
| W3C | World Wide Web Consortium |
| XML | Extensible Markup Language |
| XSD | XML Schema Definition |

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer implemented method, comprising:
 a first computing system receiving a plurality of resource descriptions, each resource description describing a resource provided by a device;
 the first computing system generating, for each received resource description, a first web service description language file describing a service corresponding to a resource provided by a device;
 the first computing system storing the first web service description language file;

the first computing system generating a second web service description language file corresponding to a group of the described services by summarizing information included in the first web service description language file; and the first computing system transmitting the second web service description language, wherein the second web service description language file is discoverable by one or more other devices.

2. The computer implemented method of claim 1, wherein a first computing system receiving a plurality of resource descriptions comprises a first computing system receiving a plurality of resource descriptions from a plurality of IoT devices.

3. The computer implemented method of claim 1, wherein a first computing system generating, for each received resource description, a first web service description language file describing a service corresponding to a resource provided by a device comprises a first computing system generating a first web service description language file describing how to access a particular service.

4. The computer implemented method of claim 3, wherein the first computing system generating a first web service description language file describing how to access a particular service further comprises the first computing system generating a first web service description language file describing one or more of when a service is available, where a service is available, and a cost associated with a service.

5. The computer implemented method of claim 1, wherein a first computing system generating a second web service description language file corresponding to a group of the described services comprises a first computing system generating a second web service description language file comprising information describing a plurality of similar services.

6. The computer implemented method of claim 5, wherein a first computing system generating a second web service description language file corresponding to a group comprises generating a WSDL-G file.

7. The computer implemented method of claim 1, further comprising receiving at a server system the second web service description language file corresponding to a group of the described services.

8. The computer implemented method of claim 7, further comprising the server system receiving from a service consumer system a request to discover services.

9. The computer implemented method of claim 8, further comprising:
in response to the request, the server system communicating to the service consumer system information regarding the second web service description language file corresponding to a group of the described services.

10. The computer implemented method of claim 9, further comprising:
the service consumer system referring to information in the second web service description language file corresponding to a group of the described services and identifying the first computing system as containing information related to services identified in the second web service description language file corresponding to a group of the described services; and
the service consumer system generating and communicating to the first computing system a request for information relating to services identified in the second web service description language file corresponding to a group of the described services.

11. The computer implemented method of claim 10, further comprising the first computing system transmitting to the service consumer system for each of a plurality of services a first web service description language file describing a service.

12. The computer implemented method of claim 11, further comprising:
the first computing system receiving for each of a plurality of services a first web service description language file describing a service;
the first computing system parsing the received first web service description language files to identify a service and parameters regarding a process to access the identified service; and
the first computing system employing the identified parameters to generate and transmit a request that the identified service be performed.

13. A system, comprising:
a gateway computing system, comprising:
a computing processor; and
computing memory communicatively coupled with the computing processor, the computing memory having stored therein executable computing instructions for performing operations, comprising:
receiving a plurality of resource descriptions, each resource description describing a resource provided by a device;
generating, for each received resource description, a first web service description language file describing a service corresponding to a resource provided by a device;
storing the first web service description language file;
generating a second web service description language file corresponding to a group of the described services by summarizing information included in the first web service description language file; and
transmitting the second web service description language file, wherein the second web service description language file is discoverable by one or more other devices.

14. The system of claim 13,
wherein receiving a plurality of resource descriptions comprises receiving a plurality of resource descriptions from a plurality of IoT devices.

15. The system of claim 13,
wherein generating, for each received resource description, a first web service description language file describing a service corresponding to a resource provided by a device comprises generating a first web service description language file describing how to access a particular service.

16. The system of claim 15,
wherein generating a first web service description language file describing how to access a particular service further comprises generating a first web service description language file describing one or more of when a service is available, where a service is available, and a cost associated with a service.

17. The system of claim 16,
wherein generating a first web service description language file comprises generating an WSDL-I file.

18. The system of claim 13,
wherein generating a second web service description language file corresponding to a group of the described services comprises generating a second web service description language file comprising information describing a plurality of similar services.

19. The system of claim 13, further comprising a server system communicatively coupled to the gateway computing system, the server system having stored therein executable computing instructions for performing operations comprising: receiving the second web service description language file corresponding to a group of the described services.

20. The system of claim 19, further comprising a service consumer system, the service consumer system communicatively coupled with the server system and the gateway computing system, wherein the server system has stored therein executable computing instructions for performing further operations comprising: receiving from the service consumer system a request to discover services.

21. The system of claim 20,
wherein the server system has stored therein executable computing instructions for performing further operations comprising: in response to the request, communicating to the service consumer system information regarding the second web service description language file corresponding to a group of the described services.

22. The system of claim 21,
wherein the service consumer system has stored therein executable computing instructions for performing further operations comprising:
referring to information in the second web service description language file corresponding to a group of the described services and identifying the gateway system as containing information related to services identified in the second web service description language file corresponding to a group of the described services, and
generating and communicating to the gateway system a request for information relating to services identified in the second web service description language file corresponding to a group of the described services.

23. The system of claim 22,
wherein the gateway computing system has stored therein executable computing instructions for performing further operations comprising: transmitting to the service consumer system for each of a plurality of services a first web service description language file describing a service.

24. The system of claim 23,
wherein the gateway computing system has stored therein executable instructions for performing further operations comprising:
receiving for each of a plurality of services a first web service description language file describing a service;
parsing the received first web service description language files to identify a service and parameters regarding a process to access the identified service; and
employing the identified parameters to generate and transmit a request that the identified service be performed.

\* \* \* \* \*